(12) United States Patent  
Ishi et al.

(10) Patent No.: US 11,364,540 B2  
(45) Date of Patent: Jun. 21, 2022

(54) METHOD OF MANUFACTURING TIP OF CUTTING TOOL

(71) Applicant: KYOCERA Corporation, Kyoto (JP)

(72) Inventors: Hirohisa Ishi, Kyoto (JP); Makoto Kimiyama, Kyoto (JP); Yoshihiro Kouzen, Kyoto (JP)

(73) Assignee: KYOCERA Corporation, Kyoto (JP)

( * ) Notice: Subject to any disclaimer, the term of this patent is extended or adjusted under 35 U.S.C. 154(b) by 930 days.

(21) Appl. No.: 15/756,127

(22) PCT Filed: Sep. 1, 2016

(86) PCT No.: PCT/JP2016/075631  
§ 371 (c)(1),  
(2) Date: Mar. 1, 2018

(87) PCT Pub. No.: WO2017/038929  
PCT Pub. Date: Mar. 9, 2017

(65) Prior Publication Data  
US 2018/0250741 A1 Sep. 6, 2018

(30) Foreign Application Priority Data

Sep. 1, 2015 (JP) .............................. JP2015-172245  
Sep. 1, 2015 (JP) .............................. JP2015-172247  
Mar. 24, 2016 (JP) .............................. JP2016-059976  
Mar. 24, 2016 (JP) .............................. JP2016-059985

(51) Int. Cl.  
*B22F 3/00* (2021.01)  
*B22F 3/24* (2006.01)  
*B22F 3/10* (2006.01)  
*B22F 3/22* (2006.01)  
*B23C 5/20* (2006.01)  
(Continued)

(52) U.S. Cl.  
CPC .............. *B22F 3/004* (2013.01); *B22F 3/001* (2013.01); *B22F 3/1021* (2013.01); *B22F 3/225* (2013.01); *B22F 3/24* (2013.01); *B22F 2003/247* (2013.01); *B22F 2005/001* (2013.01);  
(Continued)

(58) Field of Classification Search  
None  
See application file for complete search history.

(56) References Cited

U.S. PATENT DOCUMENTS

2009/0017324 A1* 1/2009 Lee et al. ............... B22D 17/10  
428/544  
2011/0189046 A1 8/2011 Bruhn et al.

FOREIGN PATENT DOCUMENTS

JP H03-193320 A 8/1991  
JP H04-283009 A 10/1992  
JP 2003-193106 A 7/2003

OTHER PUBLICATIONS

International Search Report received for International Application No. PCT/JP2016/075631 dated Nov. 29, 2016, 1 page.

* cited by examiner

*Primary Examiner* — Anthony M Liang  
(74) *Attorney, Agent, or Firm* — Viering, Jentschura & Partner MBB

(57) ABSTRACT

A method for manufacturing a tip for cutting tool use includes a shaping step of injecting a material into a mold to thereby form a molded body which becomes a tip for cutting tool use. The shaping step injects the material into the mold through a gate located on the inner side of a part corresponding to an intersecting ridge part formed by a major surface and an outer peripheral surface of the tip for cutting tool use.

8 Claims, 19 Drawing Sheets

(51) Int. Cl.
*C22C 26/00* (2006.01)
*B22F 5/00* (2006.01)
*C22C 29/08* (2006.01)

(52) U.S. Cl.
CPC ............. *B22F 2998/10* (2013.01); *B23C 5/20* (2013.01); *C22C 26/00* (2013.01); *C22C 29/08* (2013.01)

FIG.3
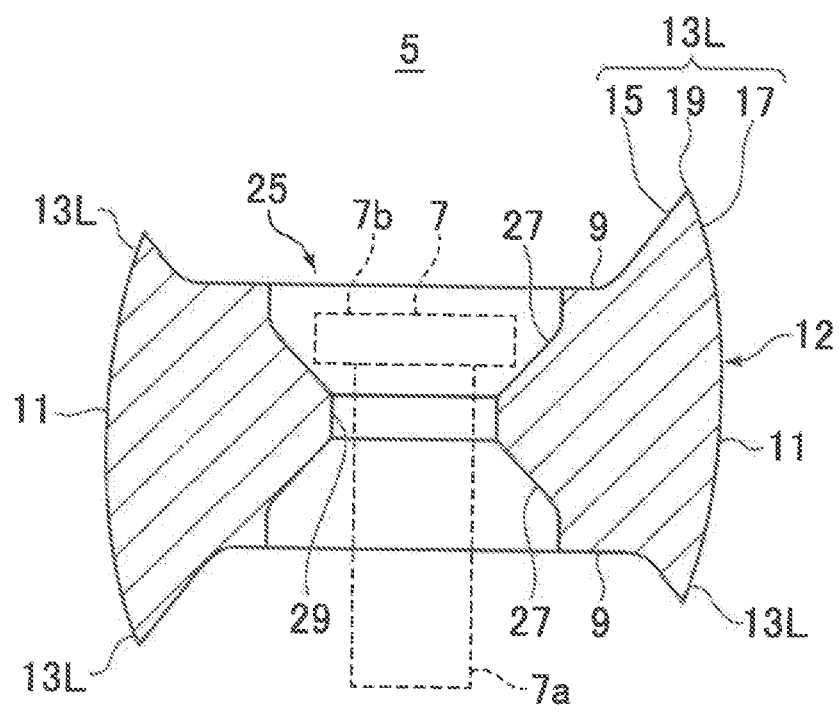
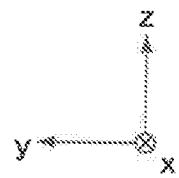

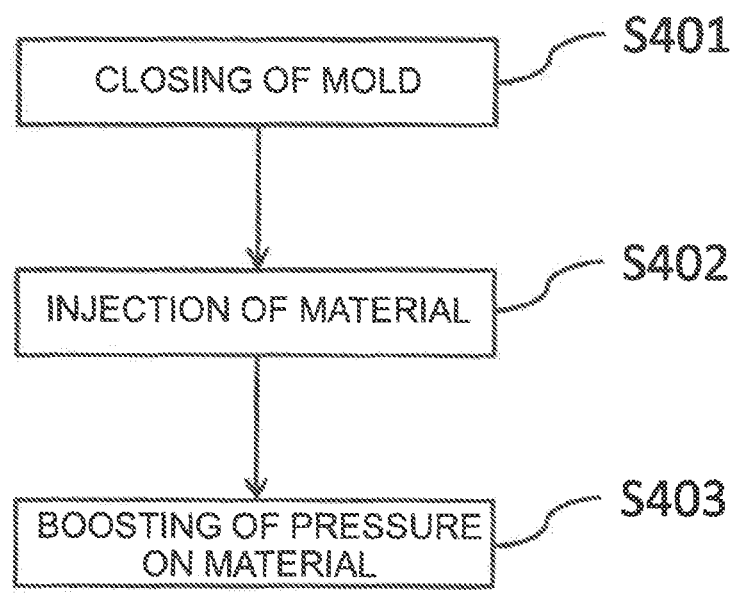

METHOD OF MANUFACTURING TIP OF CUTTING TOOL

RELATED APPLICATIONS

The present application is a national stage entry according to 35 U.S.C. § 371 of PCT application No.: PCT/JP2016/075631 filed on Sep. 1, 2016, which claims priority from Japanese application No.: 2015-172245 filed on Sep. 1, 2015, Japanese application No.: 2015-172247 filed on Sep. 1, 2015, Japanese application No.: 2016-059976 filed on Mar. 24, 2016, and Japanese application No.: 2016-059985 filed on Mar. 24, 2016, and are incorporated herein by reference in its entirety.

TECHNICAL FIELD

The present aspect relates to a method for manufacturing a tip configuring a cutting part of a cutting tool.

BACKGROUND ART

Known in the art is an "insert" (throw-away tip) which is mounted at an insert type (indexable) cutting tool and configures a cutting part. Such a tip for cutting tool use is generally formed by mixing a raw material powder of a relatively hard material and a raw material powder which forms the binding phase ingredient of this hard raw material powder, press the mixture by a die to shape it, then firing it.

Japanese Patent Publication No. 4-283009A (Patent Literature 1) proposes shaping a material by injection molding in place of pressing. Note that, in Patent Literature 1, a gate for injecting the material into a cavity of the mold is opened at a position corresponding to side surfaces of the tip for cutting tool use.

In order for the tip for cutting tool use to exhibit the desired characteristics, for example, it is important that the intersecting ridge part between the major surface and the outer peripheral surface, where the cutting edge is provided, be formed with a high precision. On the other hand, the shaping precision in injection molding is not uniform in a mold. Patent Literature 1 does not consider such a circumstance.

Accordingly, it is desired to provide a method for manufacturing a tip for cutting tool use capable of improving the shaping precision of an intersecting ridge part in injection molding.

SUMMARY OF INVENTION

A method for manufacturing a tip for cutting tool use according to one aspect includes a shaping step of injecting a material into a mold to thereby form a molded body which becomes a tip for cutting tool use. The shaping step injects the material into the mold through a gate located on the inner side of a part corresponding to an intersecting ridge part formed by a major surface and an outer peripheral surface of the tip for cutting tool use.

BRIEF DESCRIPTION OF DRAWINGS

[FIG. 3] A cross-sectional view taken along the III-III line in FIG. 2.
[FIGS. 5]
[FIG. 6] A flow chart showing a method of injection molding in the method for manufacturing the tip for cutting tool use.
[FIGS. 7]
[FIGS. 12]
[FIGS. 13]
[FIGS. 14]
[FIGS. 15]
[FIGS. 16]
[FIGS. 17]
[FIGS. 19]

DESCRIPTION OF EMBODIMENTS (Use of Terms)

Some of the terms concerning cutting tools are customarily used in multiple meanings. In the following explanation, such terms will be basically used in the following way.

"Cutting part" is used as a term designating the relatively small part configured by a rake face, flank face, and cutting edge (for example a part of the insert). The "cutting edge" is used as the term designating a ridgeline formed by the rake face and the flank face. Note, an actual cutting edge is not a line microscopically such as seen by the term "roundness of cutting edge". To this extent, the cutting edge has a surface area or volume.

The "rake face" and "flank face" mainly designate the rake face and flank face which are closest to the cutting edge. Note that, the flank face may or may not include a so-called margin.

First Embodiment (Configuration of Cutting Tool)

Figure 1:
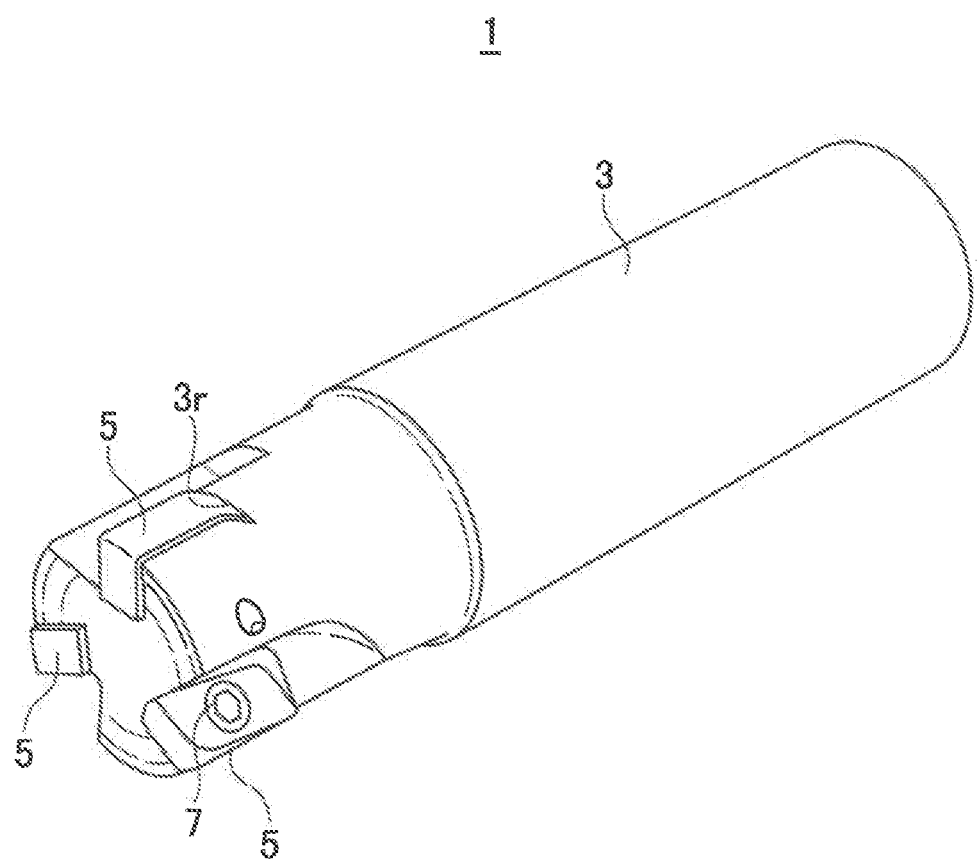
[FIG. 1] A perspective view showing an insert type cutting tool according to a first embodiment.

FIG. 1 is a perspective view showing an insert type cutting tool 1 according to a first embodiment.

The cutting tool 1 has a holder (shank) which is a substantially shaft-shaped member and is attached to a machine tool; and one or more (three in the example in FIG. 1) tips 5 which are attached to and/or detached from the part of the holder 3 on the tip end side (left side on the drawing sheet), abut against a cutting object, and actually cut the cutting object. In the example shown, the cutting tool 1 is an end mill and can cut the cutting object at its tip surface and the outer peripheral surface of the tip end by rotation around its axis.

The tip 5 is mounted with respect to the holder 3 by for example screwing a screw 7 inserted in the tip 5 with a female screw part (hidden behind tip 5, so not shown) formed in the holder 3.

In the holder 3, for example, a recessed part 3r is formed configured by a plurality of surfaces against which a plurality of surfaces of the tip 5 (for example one major surface and two side surfaces) abut. The tip 5 is positioned by abutting against the surfaces of this recessed part 3r.

(Configuration of Tip)

Figure 2:
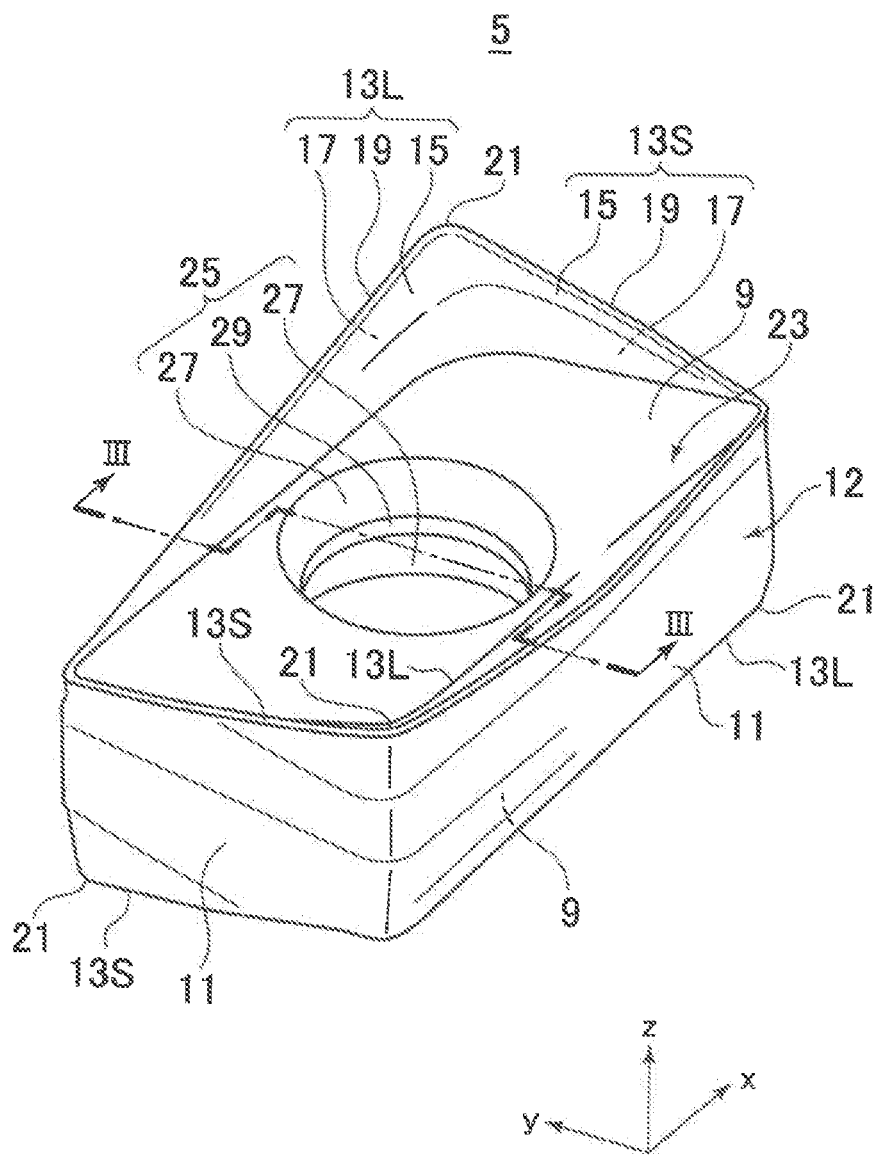
[FIG. 2] A perspective view showing a tip for cutting tool use of the cutting tool in FIG. 1.

FIG. 2 is a perspective view showing the tip 5. FIG. 3 is a cross-sectional view taken along the line in FIG. 2.

In FIG. 2 and FIG. 3 etc., an orthogonal coordinate system xyz defined fixed with respect to the tip 5 is attached. In the following explanation, sometimes directions will be explained with reference to this coordinate system. In the tip 5, any direction may be defined as the vertical direction or horizontal direction. Further, the dimension in the z-axis direction may be made relatively large. But the z-axis direction will be sometimes referred to as the "up-down direction" or "thickness direction". Further, when simply referring to "viewed on a plane" for the tip 5, the view in the z-axis direction is designated.

The tip 5 is for example formed in a substantially rectangular cuboid shape and has a pair of major surfaces 9 (upper and lower surfaces) and four side surfaces 11 connecting the pair of major surfaces 9. Note that, sometimes the entirety of all side surfaces 11 will be referred to as the "outer peripheral surface 12". The dimensions of the tip 5 may be suitably set.

The side surfaces 11 which are positioned on the long sides when viewed on a plane for example substantially expand outward as a whole. On the other hand, the side surfaces 11 positioned on the short sides when viewed on a plane are for example substantially recessed as a whole so that the center sides in the thickness direction become the lowest. Note that, these shapes may be suitably set from various viewpoints such as securing the strength and securing the flank face.

(Configuration of Cutting Parts)

The tip 5 for example has long side cutting parts 13L and short side cutting parts 13S which directly take part in cutting of the cutting object (below, sometimes simply referred to as the "cutting parts 13" and not differentiated). These cutting parts 13 are positioned at edge parts formed by the major surfaces 9 and the side surfaces 11 (that is, intersecting ridge parts). The long side cutting parts 13L and the short side cutting parts 13S are connected by the edge parts of the long sides and short sides when viewed on a plane as "corners 21 (noses)".

Combinations of long side cutting parts 13L and short side cutting parts 13S are for example provided on both of the pair of major surfaces. On each major surface 9, they are provided at the two edge parts positioned on one diagonal line. When viewed on a plane, a diagonal line provided with the cutting parts 13 on one major surface 9 side and a diagonal line provided with the cutting parts 13 on the other major surface 9 side intersect.

Accordingly, the tip 5 can use four sets of cutting parts 13 (can be used four times) by rotation by 180° around the z-axis and/or rotation by 180° around the x-axis.

Each cutting part 13 has a rake face 15 which becomes the main part performing the cutting, a flank face 17 made to curve back in order to avoid unwanted contact with the finished cut surface, and a part in which the rake face 15 is connected to the flank face 17 constituting a cutting edge 19.

Each cutting part 13 is for example formed so as to project to the thickness direction (z-axis direction) with respect to the center side of a major surface 9. Specifically, for example, the rake face 15 continues from the center side of the major surface 9 and is formed so as to rise in the thickness direction from a portion of the major surface 9 on the center side. Further, for example, the flank face 17 continues from the side surface 11 and extends to the thickness direction over the portion of the major surface 9 on the center side. Further, for example, in the cutting edge 19, the height from the center side of the major surface 9 become higher toward the corner 21 side.

In the vertical cross-sectional view as shown in FIG. 3, any inclination of the rake face 15 and flank face 17 with respect to the thickness direction (z-axis direction), inclination direction, and inclination angle may be suitably set.

As described above, in the present embodiment, the cutting parts 13 project from the major surfaces 9, therefore it is also possible to interpret that the tip 5 has a base part 23 having major surfaces 9 and side surfaces 11 and cutting parts 13 projecting from the base part 23. Further, since the cutting parts 13 project from the major surfaces 9, in the present embodiment, it is also possible to interpret that the cutting edges 19 are formed at least at one of the upper end part or lower end part of the outer peripheral surface 12.

(Configuration of Mounting Hole)

The tip 5 has a through hole. The through hole is for example a mounting hole 25 into which a screw 7 is inserted. As shown in FIG. 3, the mounting hole 25 has a receiving part 27 which accommodates a screw head 7b of the screw 7 and with which the screw head 7b is engaged and an inserting part 29 through which a male screw part 7a of the screw 7 is inserted. Receiving parts 27 are provided on the two major surface sides, while the inserting part 29 is provided between them.

The receiving parts 27 extend from the major surface 9 sides to the inserting part 29 side while being reduced in diameter. Further, the inserting part 29 become the part having the smallest diameter in the mounting hole 25. The maximum diameter of the receiving parts 27 is at least the diameter of the screw head 7b. Further, the diameter of the inserting part 29 (minimum diameter of the receiving parts 27) is smaller than the diameter of the screw head 7b and larger than the diameter of the male screw part 7a.

(Method for Manufacturing Tip)

Figure 4:
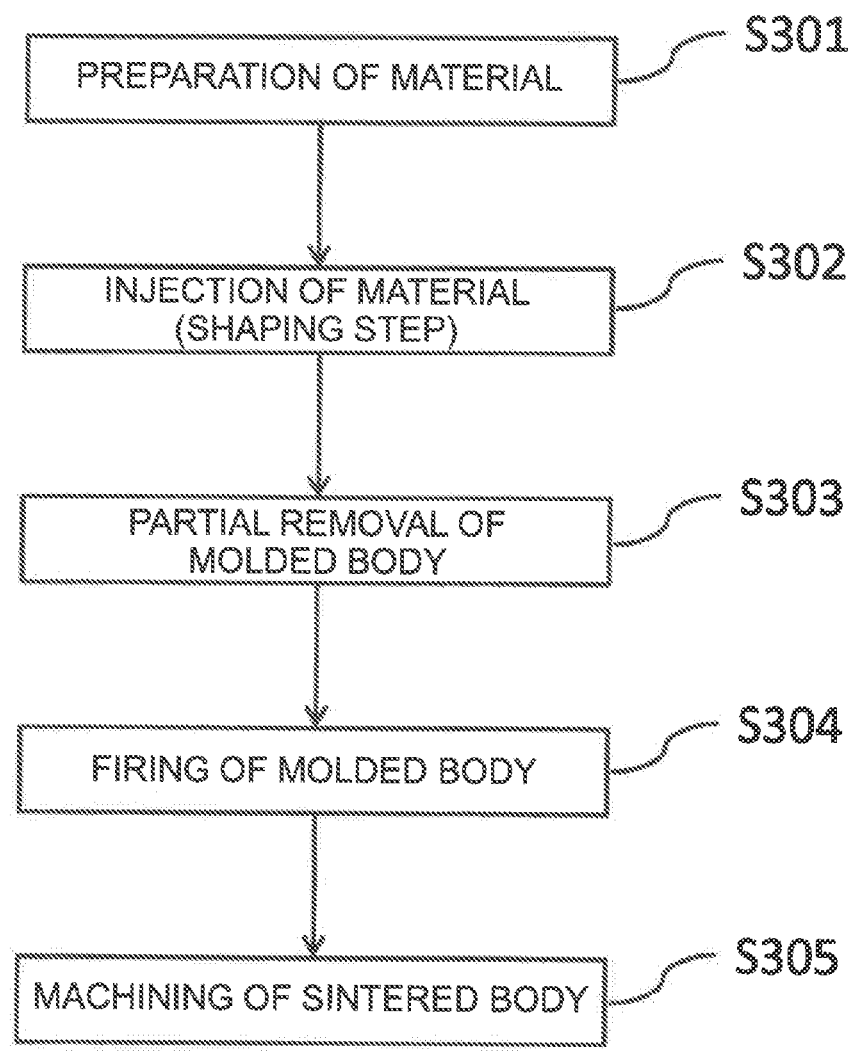
[FIG. 4] A flow chart showing a method for manufacturing a tip for cutting tool use.

FIG. 4 is a flow chart showing a method for manufacturing the tip 5. FIG. 5A to FIG. 5E are schematic views for explaining in brief the procedure of the method for manufacturing the tip 5. The manufacturing method proceeds in order from FIG. 5A to FIG. 5E.

Figure 5A:
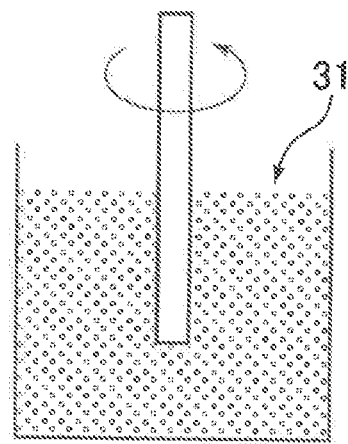
FIG. 5A to FIG. 5E are schematic views for explaining in brief the procedure of the method for manufacturing the tip for cutting tool use.

First, a material 31 of the tip 5 is prepared as indicated by notation S301 in FIG. 4 and shown in FIG. 5A. Specifically, for example, a relatively hard raw material powder which forms the principal ingredient, a raw material powder which forms the ingredient of the binding phase of this hard raw material powder, and an organic substance such as a binder for imparting fluidity to these raw material powders and imparting shape retainability to a molded body 35 are mixed etc.

When taking as an example a case where the tip 5 is made of a hard metal alloy, the raw material powder contains tungsten carbide as the principal ingredient, cobalt as the ingredient of the binding phase, and tantalum carbide and titanium carbide. As an ingredient playing a role as a binder or one resembling a binder, for example, there can be mentioned paraffin or a suitable type of resin. Note that, the tip 5 is not limited to a hard metal alloy. For example, it may be a diamond sintered body, CBN (cubic boron nitride) sintered body, ceramic in a narrow sense, cermet, or high-speed tool steel (powder HSS) formed by powder metallurgy as well.

Figure 5B:
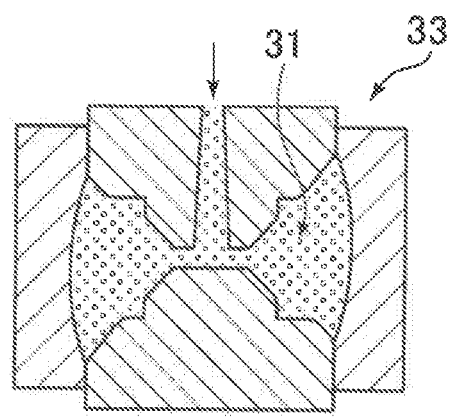

Next, as indicated by notation S302 in FIG. 4 and as shown in FIG. 5B, the material 31 of the tip 5 is injected into the mold 33 to fill it. That is, the step indicated by notation S302 in FIG. 4 is a shaping step of forming a molded body which becomes the tip for cutting tool use. The shape in the mold 33 becomes substantially the same shape as the tip 5. Accordingly, by solidification of the injected material 31 in the mold 33, a molded body 35 (FIG. 5C) having substantially the same shape as the tip 5 is formed.

Figure 5C:
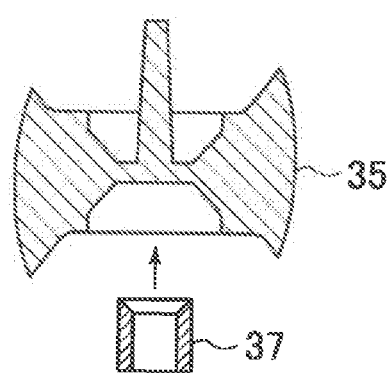

Next, as indicated by notation S303 in FIG. 4 and shown in FIG. 5C, in the molded body 35 taken out of the mold 33, parts unwanted as the tip 5 are removed. These unwanted parts are for example parts solidified at the sprue and runners (explained later). They may be removed by a suitable method. For example, they may be removed by cutting by a cutter 37.

Figure 5D:
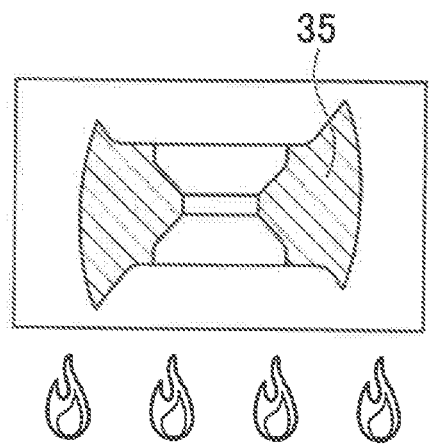

Next, as indicated by notation S304 in FIG. 4 and shown in FIG. 5D, the molded body 35 is fired (heat treatment step is carried out.). Due to this, a sintered body 39 (FIG. 5E) which becomes the tip 5 is formed. At this time, the binder which was added in order to impart fluidity to the material 31 evaporates or burns and is removed from the sintered body 39.

Figure 5E:
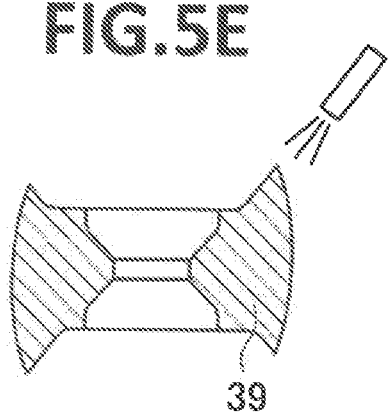

After that, as indicated by notation S305 in FIG. 4 and shown in FIG. 5E, the cutting edge of the sintered body 39 is cut or polished (honed) and the roundness etc. of the cutting edge is adjusted. Due to this, the tip 5 is obtained. The honing is for example carried out by sandblasting as exemplified in FIG. 5E.

Note that, the procedure explained above is outline of one example of the procedure up to the end and may be suitably modified. For example, the unwanted part (FIG. 5C) may be removed after firing (FIG. 5D) as well.

(Injection Molding)

FIG. 6 is a flow chart showing a shaping step by injection indicated by notation S302 in FIG. 4. FIG. 7A to FIG. 7D are schematic views for explaining the procedure of the injection molding in FIG. 5B. The injection molding proceeds in order from FIG. 7A to FIG. 7D.

Figure 7A:
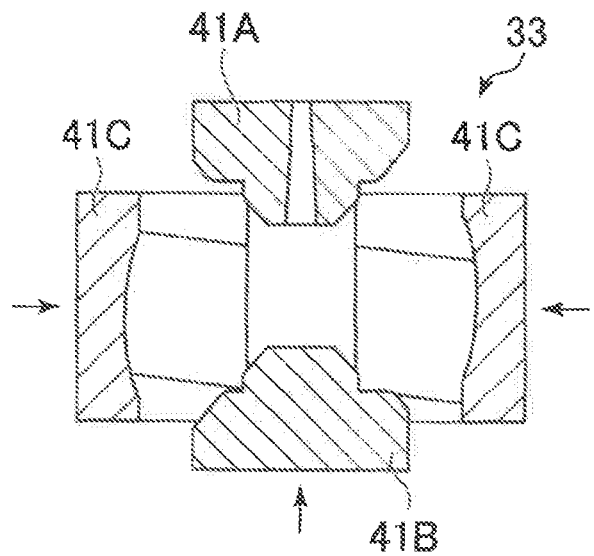
FIG. 7A to FIG. 7D are schematic views for explaining the procedure of the injection molding in FIG. 6.

First, as indicated by notation S401 in FIG. 6 and shown in FIG. 7A, the mold 33 configured by a plurality of split molds (41: 41A to 41C) is closed. Note that, the "split molds" referred to here include, for example, other than the fixed mold and moving mold, a core or slide core.

Figure 7B:
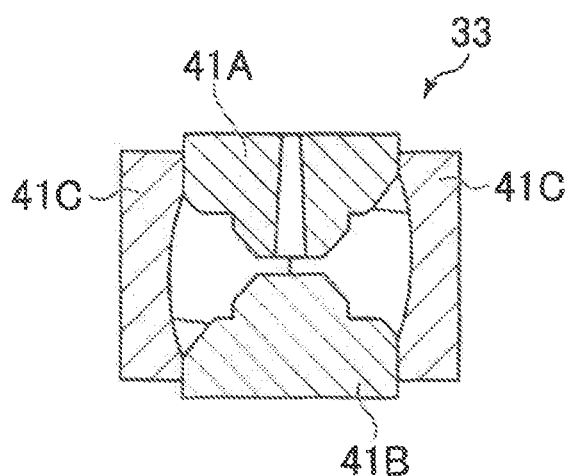

By closing the mold, as shown in FIG. 7B, a space surrounded by a plurality of split molds 41 is configured. Note that, at this time, in the mold 33, there is a suitable gas (for example air).

Figure 7C:
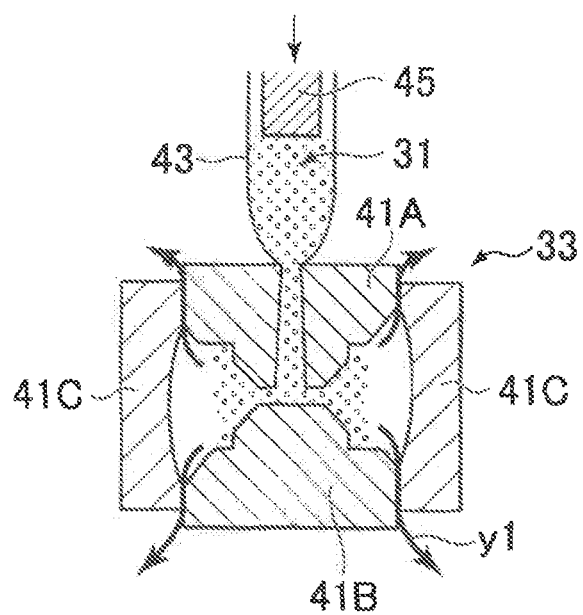

After clamping the mold, as indicated by notation S402 in FIG. 6 and shown in FIG. 7C, injection is carried out by an injection apparatus (in a narrow sense). Specifically, the material 31 in a sleeve 43 (cylinder) communicated with the interior of the mold 33 is extruded into the mold 33 by a plunger 45 in the sleeve 43. Note that, the plunger 45 may be piston shaped or may be a screw as well. The injection speed may be suitably set and may be subjected to suitable control of the speed change as well.

In the process of injection of the material 31 into the mold 33, the gas in the mold 33 is suitably discharged to the outside of the mold 33. For example, in the present embodiment, the gas in the mold 33 is discharged by the material 31 being poured through a gate which is positioned on the inner side of the wall surfaces of the mold 33 corresponding to the outer peripheral surface 12 of the tip 5 and the material 31 spreading from the inner side to the outer side.

FIG. 7C diagrammatically shows a state of discharge of gas by a not shown vent by an arrow y1. Note that, in FIG. 7C, the gas is discharged from all joined parts. Note, it is not necessary to discharge gas from all joined parts.

Figure 7D:
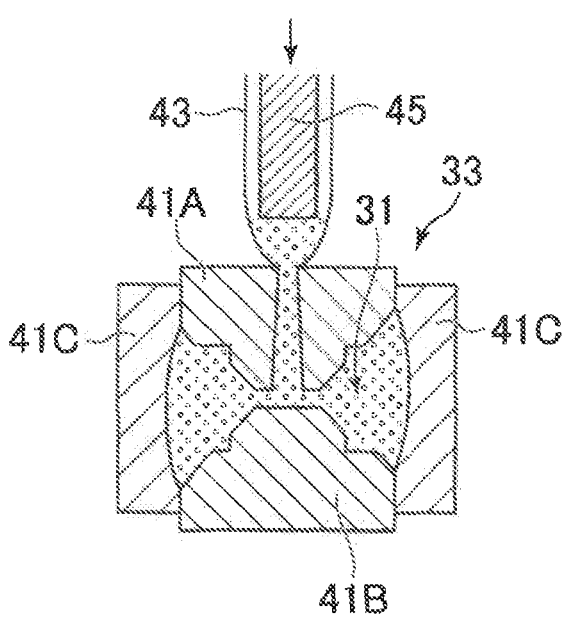

As indicated by notation S403 in FIG. 6 and shown in FIG. 7D, when the material 31 is substantially filled in the mold 33, the injection molding operation shifts from the injection step (in the narrow sense) to a boosting (pressure increasing) step. That is, the pressure of the material 31 in the mold 33 is boosted up to a predetermined pressure (final pressure) by the pressure given by the plunger 45. After that, that final pressure is maintained (pressure holding step). The material 31 filled in the mold 33 receives pressure from the plunger 45 while being robbed of heat by the mold 33 and solidified.

After that, the mold 33 is opened by a not shown mold clamping device. The molded body 35 remains in one of the plurality of split molds 41 and is extruded by a not shown pin from the split mold 41. Further, the mold 33 is washed, the mold 33 is coated with a release agent, and so on, then the next molding cycle is started.

(Configuration of Mold)

Figure 8:
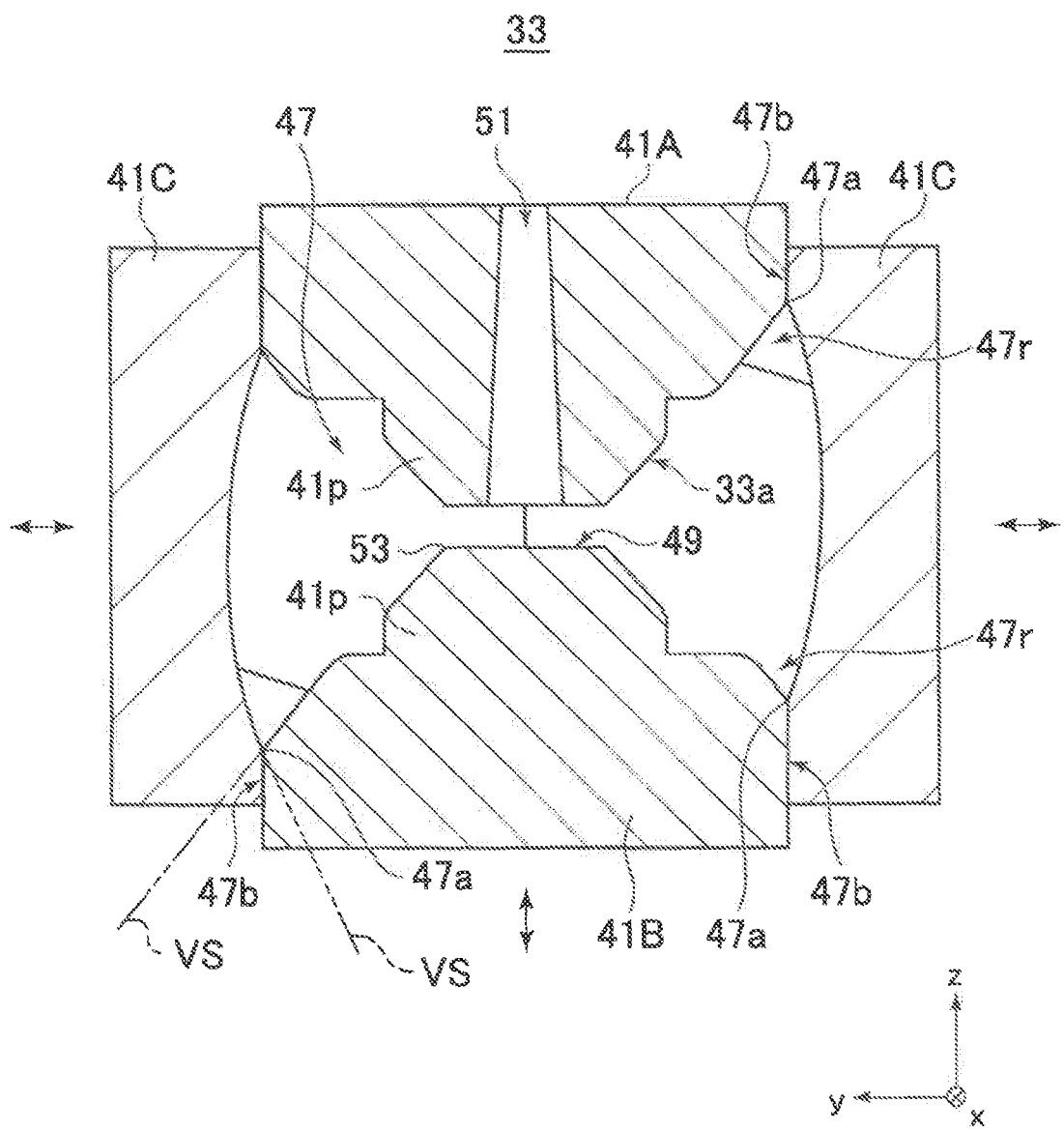
[FIG. 8] A cross-sectional view corresponding to FIG. 3 which shows a mold used in the injection molding in FIG. 6.
Figure 9:
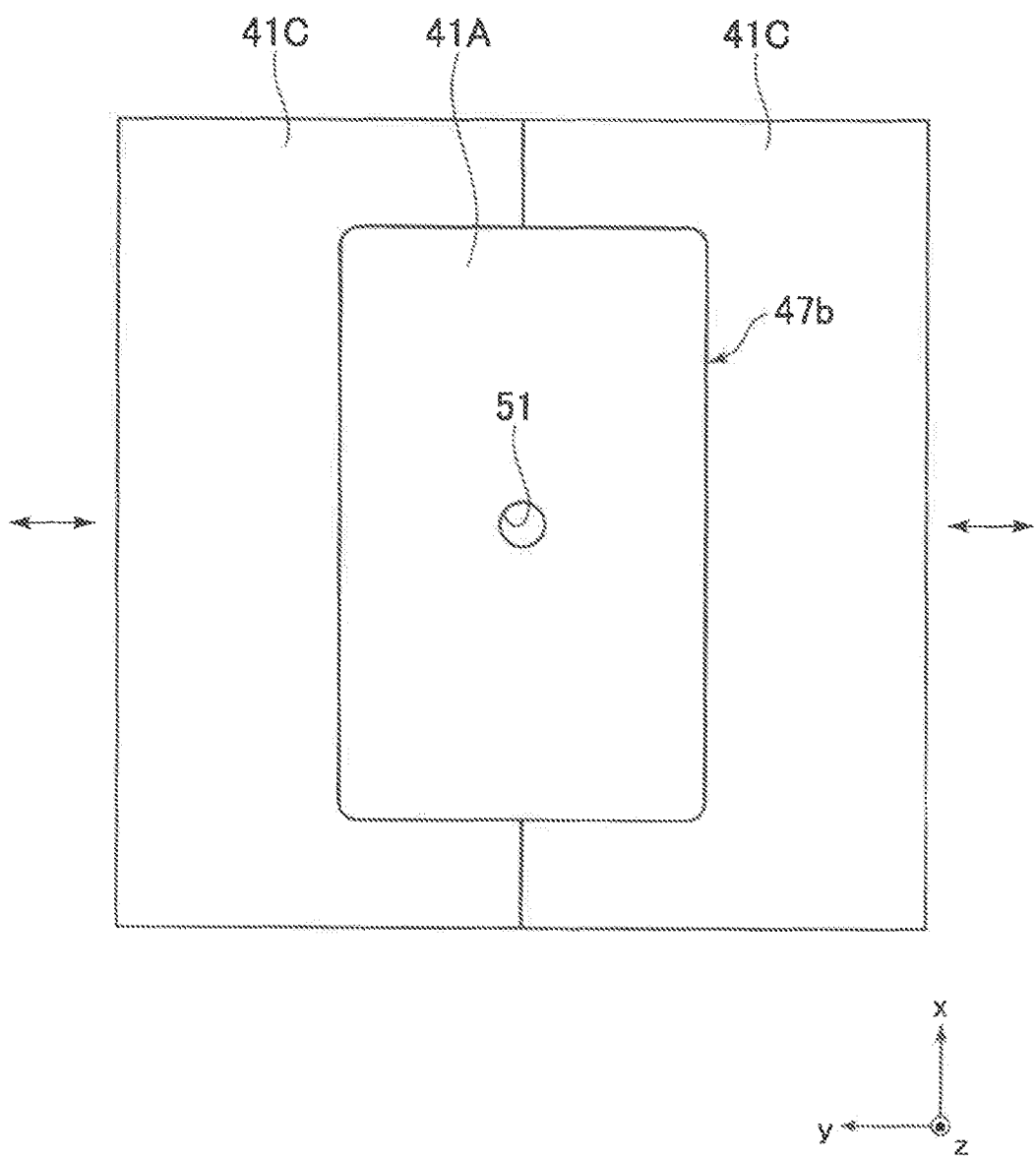
[FIG. 9] A top view of the mold in FIG. 8.

FIG. 8 is a cross-sectional view showing the mold 33. FIG. 9 is a plan view of the mold 33. These two show the mold 33 in the closed state.

The mold 33 is for example configured by a metal mold. As shown in FIG. 8, a space formed in the closed mold 33 includes a cavity 47 for forming the part which becomes the tip 5 and a runner 49 and a sprue 51 for making the material 31 flow into the cavity 47 from outside of the mold 33. Further, the mold 33 has an opening for connecting the runner 49 and the cavity 47 constituted as a gate 53.

The shape and dimensions of the cavity 47 are basically made the same as the shape and dimensions of the tip 5. (Note, shrinkage by firing is considered.) That is, the mold 33 has surfaces corresponding to the major surfaces 9 of the tip 5, its side surfaces 11, cutting parts 13, and so on. In the present embodiment, the surfaces of the mold 33 corresponding to the major surfaces 9 of the tip 5 will be referred to as the "bottom surfaces", and the surfaces corresponding to the side surfaces 11 (or outer peripheral surface 12) will be referred to as the "wall surfaces". In the present embodiment, the cutting parts 13 project from the major surfaces 9, therefore the mold 33 has recessed parts 47r which are set back from the surfaces corresponding to the major surfaces 9.

The gate 53 is for example positioned in a region in the mold 33 surrounded by the parts corresponding to the intersecting ridge parts formed by the major surfaces 9 and outer peripheral surface 12 (side surfaces 11) of the tip 5. When a plurality of cutting edges 19 are provided in the intersecting ridge parts, the gate 53 is for example positioned in regions in the mold 33 surrounded by the parts corresponding to the plurality of cutting edges 19. More specifically, for example, in the mold 33, the gate 53 is opened in the mounting hole-forming surface (or through hole-forming surface) 33a corresponding to the inner surface of the mounting hole 25. Further, the gate 53 is for example configured as a so-called "ring gate" which is opened up 360° around the z-axis.

Accordingly, the material 31 supplied to the runner 49 will flow through the gate 53 from the center side to the outer periphery side of the cavity 47. In other words, it will flow from the mounting hole 25 to the plurality of cutting edges 19.

More specifically, the gate 53, for example, is opened at a position corresponding to the inserting part 29 of the mounting hole 25 in the mounting hole-forming surface 33a. From another viewpoint, the mold 33 has projecting parts 41p having a part in the upper part and a part in the lower part of the mounting hole-forming surface 33a as their surfaces. The projecting parts 41p projecting out with reduced diameters from the surfaces of the mold 33 corresponding to the major surfaces 9 so as to correspond to the shapes of the receiving parts 27, and the gate 53 is positioned on the tip end sides of the projecting parts 41p.

The width of the gate 53 in the thickness direction (z-axis direction) of the tip 5 may be suitably set. In the illustrated example, the width of the gate 53 in the thickness direction is made equal to the size of the inserting part 29 in the thickness direction. Further, the width of the gate 53 in the thickness direction is for example constant over the circumferential direction (all of 360°). Note that, the gate 53 may be one corresponding to just a part of the inner surface of the inserting part 29 (for example a part on the center side of the thickness direction) as well.

The runner 49, for example, becomes a disk-shaped flow channel corresponding to the gate 53 being a ring gate as described above. Note that, the size of the runner 49 in the thickness direction (z-axis direction) may be different from or the same as that of the gate 53.

The sprue 51 is communicated with the runner 49 and is opened in the outer surface of the mold 33. The sprue 51 for example extends in the thickness direction (z-axis direction) and is formed in a tapered shape so that side at the external part of the mold 33 is reduced in diameter.

The mold 33 is for example divided into upper, lower, left, and right sections with respect to the cavity 47 so has four split molds 41 in total. That is, the mold 33 includes a first major surface split mold 41A configuring one major surface 9 side of the tip 5, a second major surface split mold 41B configuring the other major surface 9 side of the tip 5, and two side surface split molds 41C configuring the outer periphery side of the tip 5. The sprue 51 explained above is for example provided in the first major surface split mold 41A. The runner 49 is for example configured between the first major surface split mold 41A and the second major surface split mold 41B.

The first major surface split mold 41A and the side surface split molds 41C are for example divided along the ridgelines 47a of the cavity 47 corresponding to cutting edges 19. The boundaries of the two (boundary parts), that is, the mated surfaces 47b, are connected with the ridgelines 47a. In the present embodiment, the cutting parts 13 project from the major surfaces 9, therefore the recessed parts 47r for forming the cutting parts 13 are retracted toward the mated surfaces 47b (boundary parts).

The mated surfaces 47b of the first major surface split mold 41A or second major surface split mold 41B and the side surface split molds 41C, for example, when considering two virtual surfaces VS (FIG. 8) which are obtained by extending the surfaces corresponding to the rake faces 15 and the surfaces corresponding to the flank faces 17 to the sides where they intersect (the sides of the ridgelines 47a corresponding to cutting edges 19), are positioned between the two virtual surfaces VS (except the position matching the virtual surfaces VS).

More preferably, the mated surfaces 47b fall in a range which is positioned at the center of the two virtual surfaces VS and has an angle of half of the angle formed by the two virtual surfaces VS. Still more preferably, the mated surfaces 47b are positioned at the center of the two virtual surfaces VS.

The two side surface split molds 41C are for example divided at the centers of the short sides when viewed on a plane. The mated surfaces of the two outside of the cavity 47 are connected at the centers of the short sides. Note that, the two side surface split molds 41C may be divided at a position other than that (for example the centers of the long sides or the edges between the short sides and the long sides) as well.

The mated surfaces (47a etc.) are basically the surfaces where the split molds 41 abut. Ideally, there is no clearance between the mated surfaces of the two split molds 41. Note, a relatively minute clearance may be formed on the cavity 47 side due to abrasion as well. Further, a relatively fine clearance may be intentionally formed as well for various purposes.

As described above, in the first aspect, the method for manufacturing the tip 5 for cutting tool use according to the present embodiment has a shaping step (FIG. 5B) of injecting the material 31 into the mold 33 to thereby form the molded body 35 which becomes the tip 5. The shaping step injects the material 31 into the mold 33 through the gate 53 which is positioned in the region surrounded by the parts (ridgelines 47a) corresponding to the intersecting ridge parts by the major surfaces 9 and the outer peripheral surface 12 (side surfaces 11) of the tip 5. That is, in the shaping step, the material 31 is injected into the mold 33 through the gate 5 which is positioned in the region surrounded by the wall surfaces of the mold 33 corresponding to the outer peripheral surface 12 of the tip 5.

Accordingly, for example, the shaping precision of the intersecting ridge parts in injection molding is improved. Specifically, for example, this is as follows. In injection molding, as explained with reference to FIG. 7D, a relatively high pressure is given to the material 31 while the material 31 is solidified. As a result, when the material 31 is solidified and its volume is reduced and a clearance is formed between the material 31 and the inner surface of the mold 33, the material 31 is further injected. At this time, the amount of shift of the solidified material 31 relative to the mold 33 is larger at the position closer to the gate 53, consequently the shaping precision of the molded body 35 falls. However, if, as in the present embodiment, the gate 53 is positioned in the region surrounded by the intersecting ridge parts, the intersecting ridge parts are positioned at positions which are relatively distant from the gate 53, therefore concern over a drop in the shaping precision of the intersecting ridge parts as described above is reduced.

Further, the method for manufacturing the tip 5 for cutting tool use according to the present embodiment is a method of production of a tip 5 having a plurality of cutting edges 19 on the outer periphery side when viewed in the thickness direction (z-axis direction) and has a shaping step (FIG. 5B) of injecting the material 31 into the mold 33 to thereby form the molded body 35 which becomes the tip 5. The shaping step injects the material 31 into the mold 33 through the gate 53 which is positioned in the region surrounded by the parts (ridgelines 47a) corresponding to the plurality of cutting edges 19 when viewing the mold 33 in the direction corresponding to the thickness direction.

Accordingly, for example, the shaping precision of the plurality of cutting edges 19 in the injection molding is improved.

Specifically, for example, this is as follows. In the injection molding, as explained with reference to FIG. 7D, a relatively high pressure is given to the material 31 while the material 31 is solidified. As a result, when the material 31 is solidified and its volume is reduced and a clearance is formed between the material 31 and the inner surface of the mold 33, the material 31 is further injected. At this time, the amount of shift of the solidified material 31 relative to the mold 33 is larger at the position closer to the gate 53, consequently the shaping precision of the molded body 35 falls. However, if, as in the present embodiment, the gate 53 is positioned in the region surrounded by the plurality of cutting edges 19, the plurality of cutting edges 19 are positioned at positions which are relatively distant from the gate 53, therefore concern over a drop in the shaping precision of the cutting edges 19 as described above is reduced.

Further, in the present embodiment, the gate 53 is positioned on the through hole-forming surface (mounting hole-forming surface 33a) in the mold 33 corresponding to the inner surface of the through hole (mounting hole 25) of the tip 5.

Accordingly, for example, the gate 53 is positioned in the mounting hole 25 which is generally positioned at the center (center of gravity) of the tip 5 when viewed on a plane, therefore the effect of improvement of the shaping precision of the cutting edges 19 explained above increases. Further, for example, even if residue remains in the molded body 35 after removing the unnecessary parts (parts formed by the runner 49) from the part which becomes the tip 5, the residue is positioned in the mounting hole 25, therefore the influence by the residue exerted upon the function of the tip 5 is reduced. For example, if the residue after removal is positioned on the major surface 9 or side surface 11, there is a concern that the tip 5 will not be positioned in the holder 3 with a high accuracy due to the residue after removal sticking out. However, such a concern is reduced.

Further, in the present embodiment, the gate 53 is provided to extend over one turn so that it is continuous in the circumferential direction of the mounting hole-forming surface 33a. The material 31 is injected through the gate 53 toward the entire circumference of the wall surface of the mold 33.

Accordingly, for example, the material 31 spreads up to 360°, therefore concern over formation of a weld line by merging of the material 31 is reduced. That is, the quality of the tip 5 is improved.

Further, in a second aspect, the method for manufacturing the tip 5 for cutting tool use according to the present embodiment is a method of production of the tip 5 having cutting edges 19 positioned on the outer periphery side with respect to the pair of major surfaces 9, and the mounting hole 25 penetrating through the pair of major surfaces 9, and has a shaping step (FIG. 5B) of injecting the material 31 into the mold 33 to thereby form the molded body 35 which becomes the tip 5. The shaping step injects the material 31 into the mold 33 through the gate 53 of mold 33 which is opened in the mounting hole-forming surface 33a corresponding to the inner surface of the mounting hole 25 of the tip 5.

Accordingly, for example, the mounting hole 25 is generally located at the most distant position from the outer peripheral surface 12 (cutting edges 19), therefore the gate 53 ends up being separated most from the cutting edges 19, so the shaping precision of the cutting edges 19 in the injection molding is improved. Further, for example, even if residue remains at the position of the gate 53 after removing the unnecessary parts from the molded body 35, the influence thereof exerted upon the function of the tip 5 is small.

Further, in the present embodiment, in the mold 33, the projecting part 41p having at least a part of the mounting hole-forming surface 33a as its surface projects out from the surface corresponding to one of the pair of major surfaces 9 to the gate 53 side while being reduced in diameter. For this reason, even if the residue remaining after removing the unnecessary parts from the molded body 35 remains at the position of the gate 53, the influence by the residue exerted upon the mounting of the tip 5 is reduced.

Further, in the present embodiment, the mold 33 has parts for forming the cutting edges 19 in the edge parts formed by the surfaces corresponding to the major surfaces 9 and the surface corresponding to the outer peripheral surface 12. For this reason, the effect of improvement of the shaping precision of the cutting edges 19 by separation of the cutting edges 19 from the gate 53 increases.

Further, in the present embodiment, the mold 33 has parts for forming the cutting edges 19 which are positioned in the edge parts formed by the major surfaces 9 and the outer peripheral surface 12 at the two major surfaces 9 of the tip 5. Further, the mold 33 has the projecting parts 41p projecting from the surfaces corresponding to the major surfaces 9 to the gate 53 side while being reduced in diameter at the two major surfaces 9 of the tip 5.

Accordingly, for example the gate 53 has a long distance relative to the cutting edges 19 provided on the two major surface 9 sides, therefore the precision of the cutting edges 19 on the two major surface 9 sides is improved. Further, for example, when the projecting parts 41p reduced in diameter are formed in the upper and lower parts, the shape of the cavity 47 from the gate 53 to the outer periphery side becomes a reverse tapered shape gradually expanding toward the upper and lower parts (z-axis direction) on the vertical cross-section as shown in FIG. 8. That is, when viewed in the flow direction of the material 31, the change of the area of the cross-section of the flow channel becomes gentle. As a result, the flow of the material 31 becomes smooth, and the shaping precision is improved.

Note that, in the present embodiment, the side surfaces 11 positioned on the long sides when viewed on a plane expand outward as a whole. This contributes to equalization in the thickness direction of distances from the gate 53 positioned on the center side of the thickness direction up to the side surfaces 11.

(First Modification)

Figure 10:
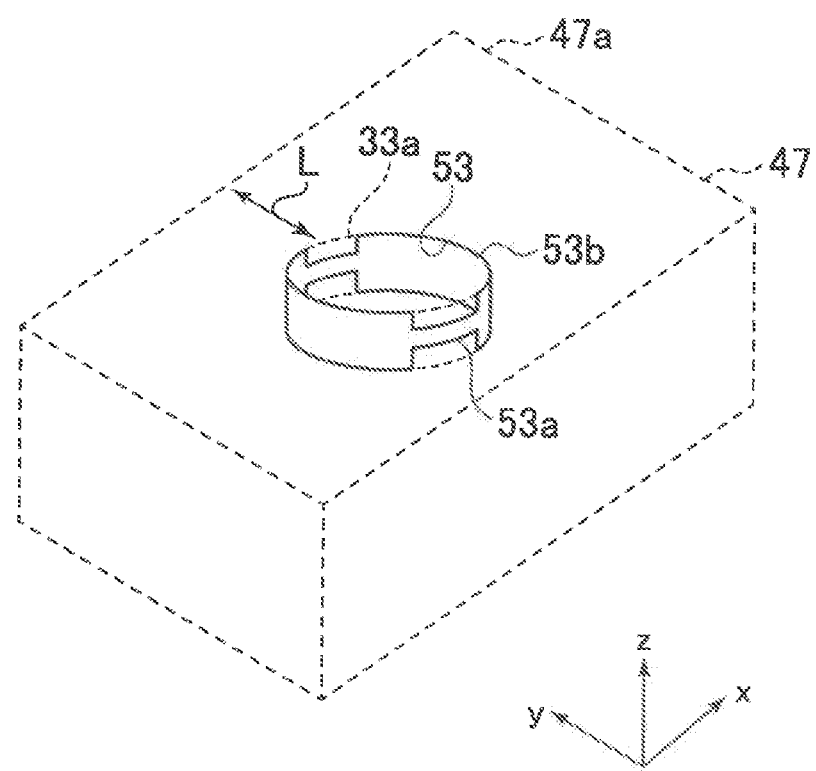
[FIG. 10] A perspective view showing a gate of the mold according to a first modification.

FIG. 10 is a schematic perspective view showing a gate 53 according to a first modification. Note that, the first modification 53 is basically different from the embodiment only in the shape of the gate 53. However, the shape of the runner 49 may also be different too in accordance with the difference of the shape of the gate 53.

In this modification as well, in the same way as the embodiment described above, the gate 53 is opened at a position corresponding to the inserting part 29 in the mounting hole-forming surface 33a for forming the inner surface of the mounting hole 25. However, in the gate 53, the width in the thickness direction (z-axis direction) is not constant in the circumferential direction, but changes according to the position in the circumferential direction.

The change of the width of the gate 53 with respect to the circumferential direction may be suitably set. For example, the width of the gate 53 may be made broader at positions where the distance with respect to the side of the tip 5 when viewed on a plane is relatively long. From another viewpoint, the gate 53 has first parts 53a and second parts 53b which are different from each other in position in the circumferential direction. The second parts 53b are longer than the first parts 53a in the distance L (for example the shortest distance) up to the surface of the mold 33 corresponding to the outer peripheral surface of the tip 5 and are larger than the first parts 53a in the width in the direction corresponding to the thickness direction.

The width of the gate 53 may change continuously or stepwise. When the change occurs stepwise, there may be two types of widths or three or more types of widths. In the illustrated example, the gate 53 is given two types of width. The gate 53 has the first parts 53a positioned on the side of long sides when viewed on a plane, and the second parts 53b positioned on the side of short sides when viewed on a plane.

In this way, the gate 53 which is provided as a ring gate at the mounting hole-forming surface 33a differs in the width in the direction corresponding to the thickness direction according to the position in the circumferential direction. Accordingly, for example, by suitably adjusting the width of the gate 53 in accordance with the shape of the tip 5, the positions of the cutting edges 19, and so on, the flow of the material 31, and so on can be optimized.

For example, by making the width of the parts with distances with respect to the sides when viewed on a plane which are relatively long (second parts 53b) relatively large, the time lag between the timing when the material 31 reaches the sides far from the gate 53 and the timing when it reaches the sides close to the gate 53 can be made smaller. As a result, for example, concern over formation of the weld line in the outer periphery of the tip 5 can be reduced. Consequently, concern over formation of the weld line in the cutting edges 19 provided on the outer periphery side of the tip 5 can be reduced.

(Second Modification)

Figure 11:
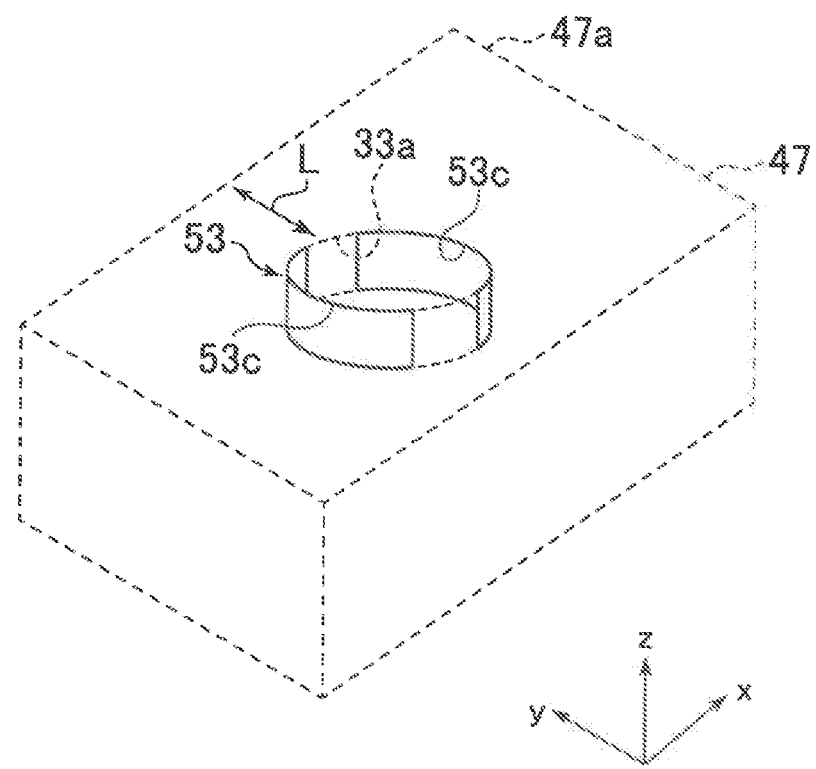
[FIG. 11] A perspective view showing a gate of the mold according to a second modification.

FIG. 11 is a schematic perspective view showing a gate 53 according to a second modification. Note that, the second modification is basically different from the embodiment only in the shape of the gate 53. However, the shape of the runner 49 may also be different matching the difference of shape of the gate 53.

In this modification as well, in the same way as the embodiment described above, the gate 53 is opened at a position corresponding to the inserting part 29 in the mounting hole-forming surface 33a for forming the inner surface of the mounting hole 25. However, the gate 53 is not provided continuously in the circumferential direction to make one turn, but is provided dispersed at a plurality of positions in the circumferential direction. That is, the gate 53 has a plurality of openings 53c arranged in the circumferential direction. The material 31 is partially injected through the gate 53 for the entire circumference of the wall surface of the mold 33.

The positions (ranges) of the plurality of openings 53c in the circumferential direction may be suitably set. For example, the plurality of openings 53c are provided in the mounting hole-forming surface 33a at positions where the distances with respect to the sides of the tip 5 when viewed on a plane are relatively long. That is, in the plurality of openings 53c, the distance L up to the surface corresponding to the outer peripheral surface of the tip 5 of the mold 33 is longer than the region between two or more openings 53c.

In this way, the gate 53 provided in the mounting hole-forming surface 33a has a plurality of openings 53c arranged in the circumferential direction. Accordingly, for example, it is possible to suitably set the positions and number of the plurality of openings 53c in accordance with the shape of the tip 5, the positions of the cutting edges 19, and so on to optimize the flow of the material 31 and so on.

For example, by provision of the openings 53c at positions having relatively long distances with respect to the sides when viewed on a plane, the time lag between the timing when the material 31 reaches the sides far from the gate 53 and the timing when it reaches the sides close to the gate can be made smaller.

(Example of Shape of Runners According to Second Modification)

Figure 15A:
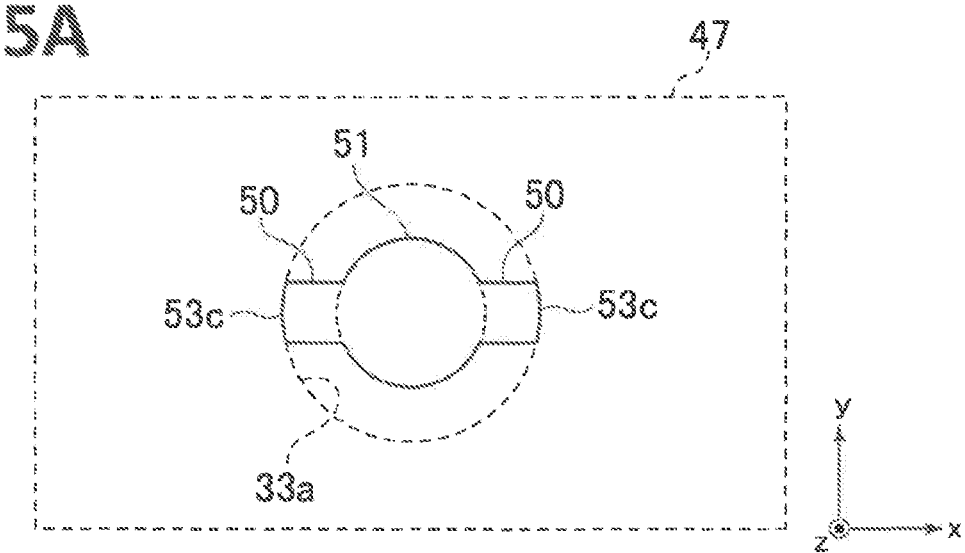
FIG. 15A and FIG. 15B are a plan view and perspective view showing an example of the shape of the runners for the gate in FIG. 11.
Figure 15B:
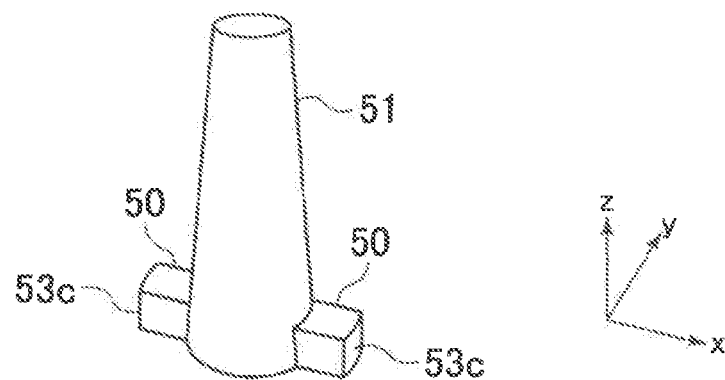

FIG. 15A is a plan view showing a first example of the shape of runners 50 which supply material 31 to the gate 53 according to the second modification explained above. FIG. 15B is a perspective view showing the runners 50 in FIG. 15A.

In this first example of shape, the sprue 51 is for example the same as the sprue 51 shown in the embodiments. That is, the sprue 51 extends in the thickness direction (z-axis direction) and is formed in a tapered shape so that side at the external part of the mold 33 is reduced in diameter. Note that, in the explanation of the embodiments, the flow channel on the upper side from the inserting part 29 (the flow channel on the upper side from the disk-shaped runner 49) was grasped as the sprue 51. In the explanation of this first example of shape, the sprue 51 is made the part which extends up to the inner side of the inserting part 29 in the thickness direction. The sprue 51 need not be a tapered shape in the inserting part 29.

The number of runners 50 to be provided is made the same as the number of openings 53c of the gate 53 (two in the illustrated example). Further, the runners 50 for example linearly extend from the sprue 51 to the openings 53c with substantially constant cross-sectional areas (areas in the yz cross-section). In the illustrated example, the sprue 51 is positioned at the center on the inner side of the mounting hole-forming surface 33a, and the two runners 50 extend from the center side of the cavity 47 toward the short sides (that is, the sides where the distance L is relatively long) and extend to reverse sides to each other.

The shapes and dimensions of the lateral cross-sections (yz cross-section) of the runners 50 may be suitably set. For example, the shapes of the lateral cross-sections of the runners 50 are rectangular in the illustrated example.

Figure 15C:
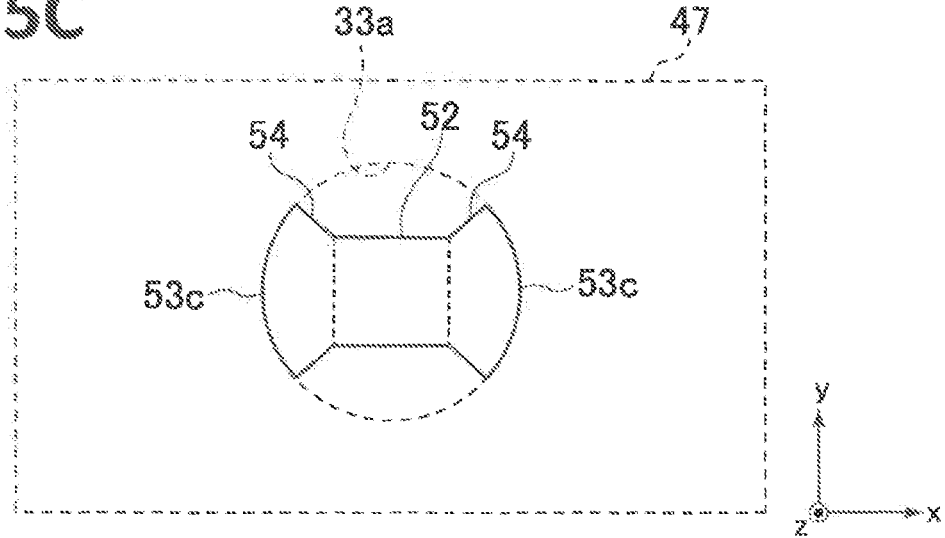
FIG. 15C is a plan view showing another example of the shape of the runners for the gate in FIG. 11.

FIG. 15C is a plan view showing a second example of the shapes of runners 54 which supply the material 31 to the gate 53 according to the second modification. Note that, in this second example of shape, the sprue 52 is formed in rectangular shape when viewed on a plane.

As shown in this diagram, the runners 54 supplying the material 31 to the openings 53c may be circular sectors as well. Note, for a preferred mode of operation which will be explained later with reference to FIG. 16D etc., desirably the runners 50 are straight shapes with constant widths as shown in FIG. 15A.

(Mode of Operation by First Example of Shape of Runners According to Second Modification)

FIG. 16A to FIG. 16I are schematic views for explaining the mode of operation of the runners 50 according to the first example of shape.

Figures 16A, 16B, 16C:
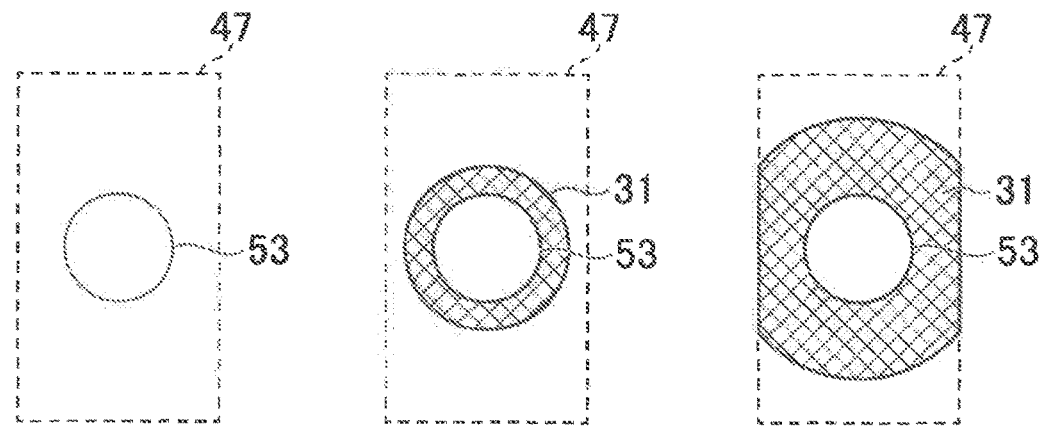
FIG. 16A to FIG. 16I are schematic views for explaining the mode of operation of the runners.

FIG. 16A to FIG. 16C are schematic plan views for explaining the flow of the material 31 when the gate 53 is formed as a ring gate as in the embodiments.

FIG. 16A shows a state before the material 31 flows into the cavity 47 through the gate 53. As shown in FIG. 16B, when the material 31 begins to flow into the cavity 47 through the gate 53, the material 31 substantially equally spreads in all directions since the gate 53 is a ring gate. Further, as shown in FIG. 16C, the material 31 reaches the long sides of the cavity 47 having the distance L close to the gate 53. After that, although not particularly shown, the material 31 reaches the short sides of the cavity 47 and is further filled in the cavity 47.

According to the flow of the material 31 as described above, for example, as already explained, the formation of the weld line due to joining of the material 31 is suppressed.

For example, as in the case where the shape of the tip 5 when viewed on a plane is a square, when the distances from the gate 53 to the wall surfaces of the cavity 47 when viewed on a plane are equal, it is particularly effective that the gate 53 be a ring gate.

On the other hand, for example, as in the case where the shape of the tip 5 when viewed on a plane is rectangular, when the distances from the gate 53 to the wall surfaces of the cavity 47 when viewed on a plane are not equal, as shown in FIG. 15A, a configuration providing runners 50 extending toward the short sides and openings 53c (gate 53) opening toward the short sides becomes effective. As the reason for that, the following can be mentioned.

The flow of the material 31 when the runners 50 shown in FIG. 15A are provided becomes a flow as shown in the plan views of FIG. 16D to FIG. 16G.

Figures 16D, 16E, 16F, 16G:
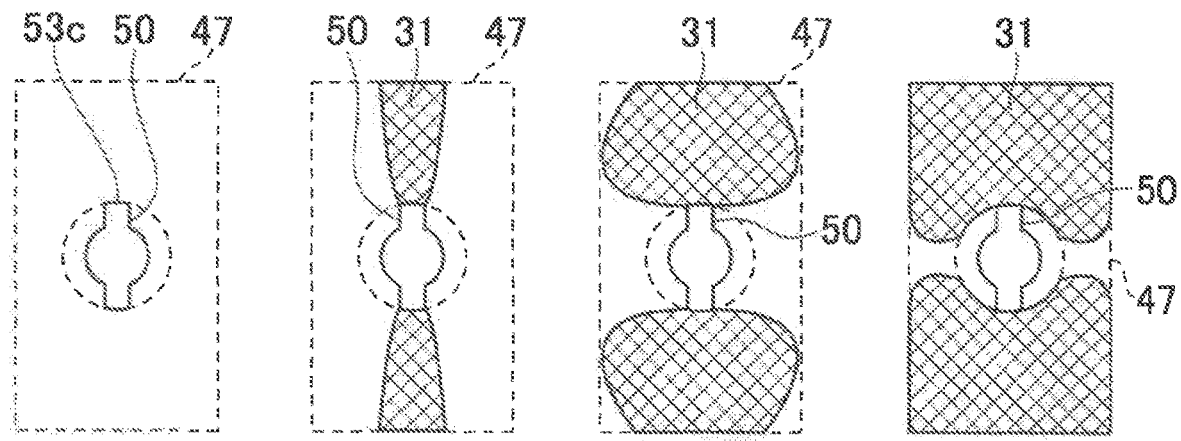

FIG. 16D shows a state before the material 31 flows through the openings 53c in the gate 53 into the cavity 47. As shown in FIG. 16E, when the material 31 begins to flow from the gate 53 into the cavity 47, the material 31 substantially linearly flows and reaches the short sides of the cavity 47. Next, as shown in FIG. 16F, the material 31 spreads toward the long sides. Next, as shown in FIG. 16G, the material 31 arrives at the short sides and at the short side sides of the long sides, so is substantially filled at both sides of the cavity 47 in the longitudinal direction. After that, although not particularly shown, the material 31 which is substantially filled at both sides in the longitudinal direction merges at the center side in the longitudinal direction, therefore the material 31 is filled in the entire cavity 47.

Accordingly, the material 31 reaches the short sides of the cavity 47 first. As a result, unevenness in shrinkage of the material 31 at the time of shaping and/or time of firing due to the material 31 reaching the long sides first becomes smaller.

Figures 16H, 16I:
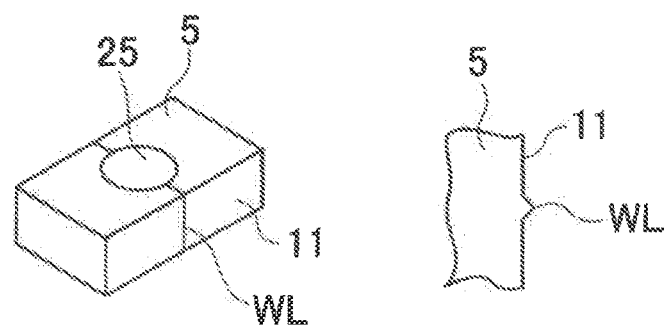

Note that, as understood from FIG. 16G, in the case of such a flow, as shown in the perspective view of FIG. 16H, sometimes weld line WL is formed on the center side of the tip 5 in the longitudinal direction. As shown in the partially enlarged plan view of the side surface 11 of the tip 5 in FIG. 16I, the weld line WL forms a projection having a small height (for example about 40 μm).

When it is necessary to suppress the influence by the weld line WL upon mounting of the tip 5 and cutting performance etc., for example, the projection formed by the weld line WL may be removed together with the burr in the polishing for removing a burr.

Figure 17A:
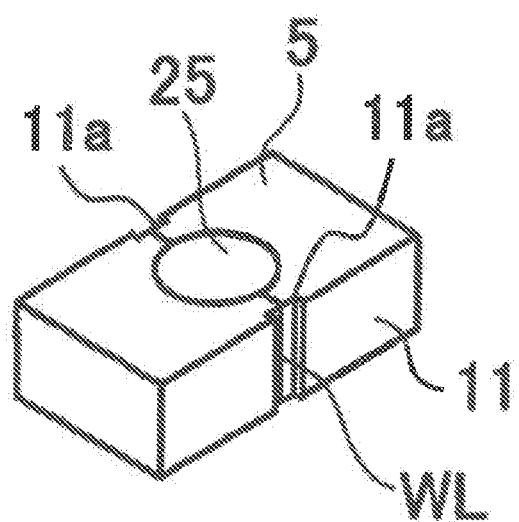
FIG. 17A is a perspective view showing a modification of the tip for cutting tool use in FIG. 16H.

FIG. 17A is a perspective view showing a modification of the tip 5 of FIG. 16H. Further, FIG. 17B is a partially enlarged plan view showing a modification of the tip 5 in FIG. 16I.

Figure 17B:
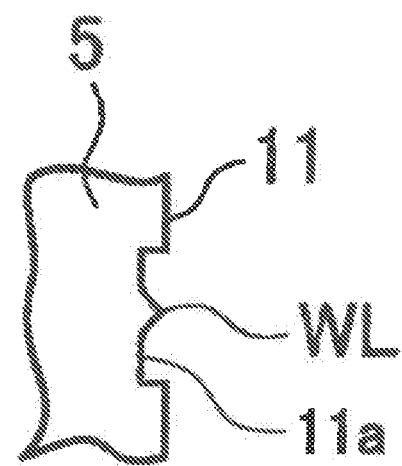
FIG. 17B is a partially enlarged plan view showing a modification of the tip for cutting tool use in FIG. 16I.

In order to stably suppress the influence by the weld line WL upon mounting of the tip 5 and cutting performance etc., for example, as shown in FIG. 17A and FIG. 17B, the side surfaces 11 of the tip 5 maybe configured formed with groove parts 11a in the regions where the weld line WL is formed.

When the side surfaces 11 have the groove parts 11a described above, even if the above projection is not removed by polishing, it is possible to stably suppress the influence by this projection upon mounting of the tip 5 and cutting performance etc.

Groove parts 11a may open at the pair of major surfaces 9 (upper and lower surfaces) as well. Further, they may be separated from the pair of major surfaces 9 (upper and lower surfaces) as well. Further, in order to more reliably suppress the influence by the weld line WL upon mounting of the tip 5 and cutting performance etc., preferably the depths of the groove parts 11a are deeper than the height of the weld line WL (projection).

(Third Modification)

Figure 18:
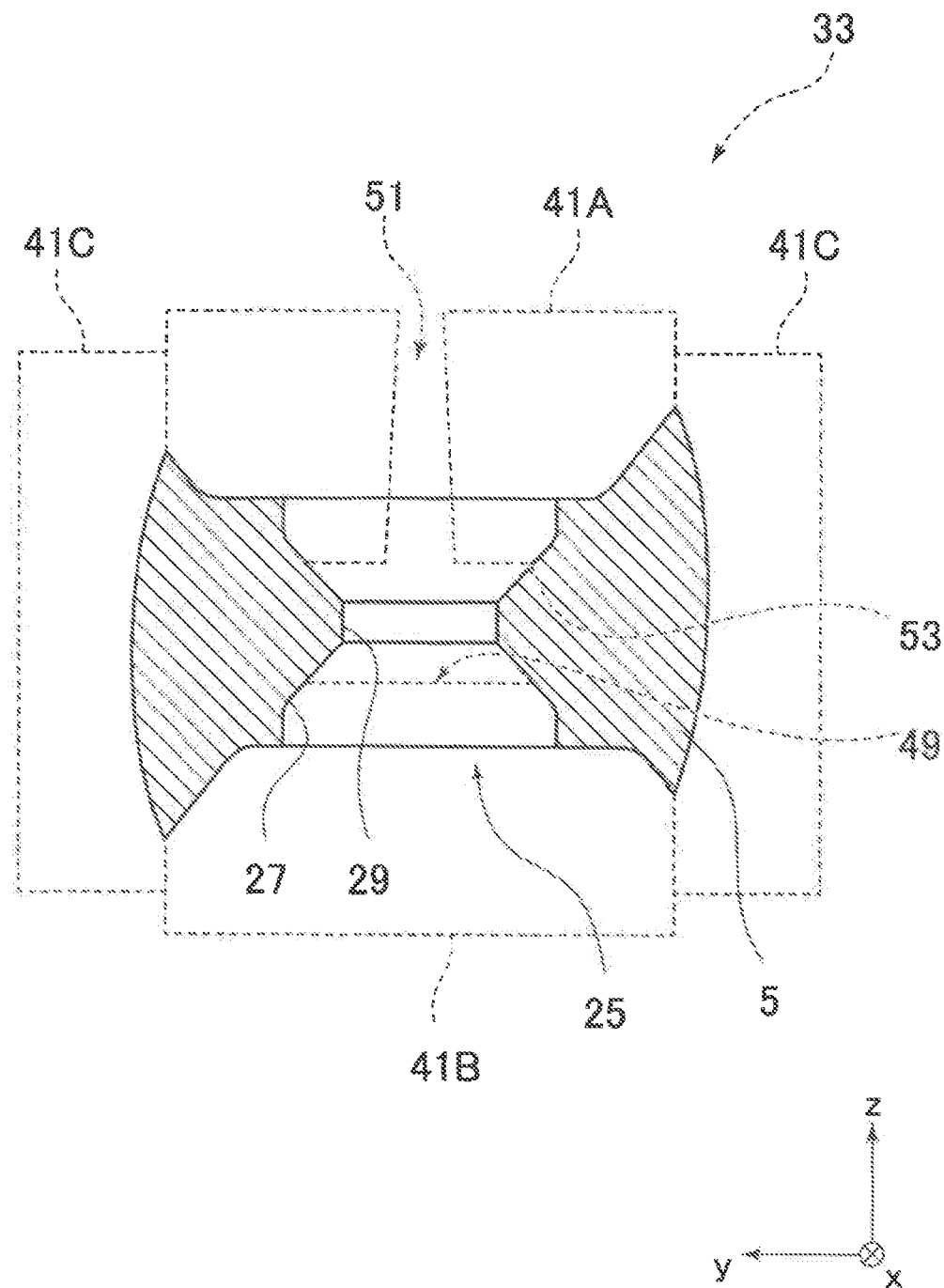
[FIG. 18] A schematic view for explaining a modification of the thickness of the gate.

FIG. 18 is a schematic cross-sectional view showing a gate 53 according to a third modification. Note that, in the following description, the explanation will be given by taking as an example the shape of the gate 53 in the embodiment, but the third modification may be applied with respect to the shape of the gate 53 in the first or second modification as well.

In this diagram, the cross-section of the tip 5 is shown. The cross-sectional shape of the mold 33 is indicated by dotted lines. As shown in this diagram, the width of the gate 53 of the mold 33 in the thickness direction (z-axis direction) becomes thicker than the thickness of the inserting part 29. For example, in the illustrated example, the gate 53 positions the inserting part 29 at the center in the thickness direction. Further, the edge parts of the gate 53 in the thickness direction are positioned at heights in the middle of the receiving parts 27. That is, the width of the gate 53 in the thickness direction is larger than the thickness of the inserting part 29 and less than the thickness of the mounting hole 25. Note that, it is also possible to make the width of the gate 53 equal to the thickness of the mounting hole 25.

When such a gate 53 is provided, for example, compared with the case where the width of the gate 53 is not more than the thickness of the inserting part 29, the material 31 can be quickly injected into the cavity 47.

On the other hand, if such a gate 53 is provided, a part of the receiving part 27 is no longer formed by the inner surface of the mold 33 since the gate 53 is superimposed also on the receiving part 27 (inclined surface). Accordingly, unlike the case explained with reference to FIG. 5C, it is necessary to form a part (inclined surface) of the receiving part 27 at the time of removal or after the removal of the unwanted parts.

FIG. 19A to FIG. 19D are schematic cross-sectional views showing an example of the method for forming the receiving parts 27.

Figure 19A:
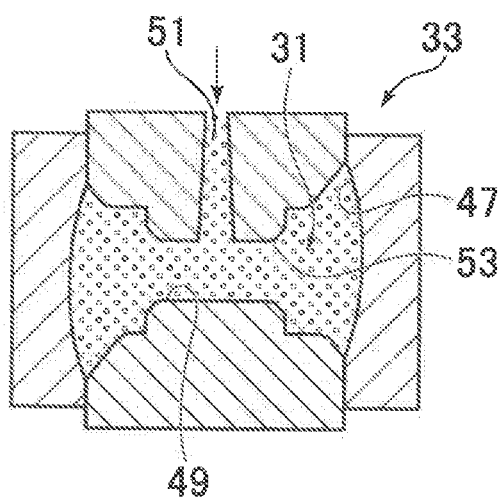
FIG. 19A to FIG. 19D are schematic views for explaining an example of the method of formation of a mounting hole in FIG. 18.

First, as shown in FIG. 19A, the material 31 is injected into the cavity 47 through the gate 53 given a width made larger than the inserting part 29. Due to this, a molded body 35 (FIG. 19B) is formed so that parts of the receiving parts 27 on the sides of the inserting part 29 (not formed in FIG. 19A) are buried in the unwanted parts.

Figure 19B:
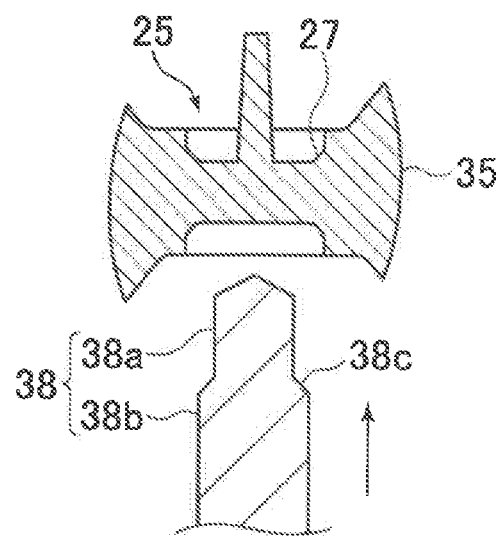
Figure 19C:
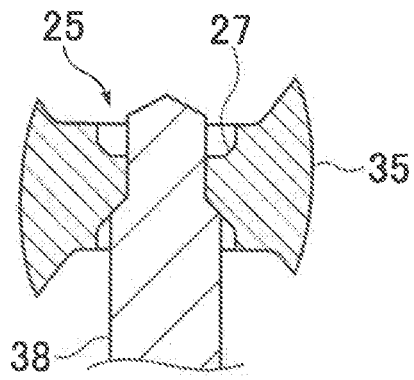

Next, as shown in FIG. 19B and FIG. 19C, a stepped drill 38 is used to form a through hole in the molded body 35 from either side of the molded body 35 in the thickness direction (in the illustrated example, may be the opposite side to the part corresponding to the sprue 51 or the side of the part corresponding to the sprue 51) and in turn remove the unwanted parts.

The stepped drill 38 for example has a small diameter part 38a and a large diameter part 38b having a larger diameter than the small diameter part 38a. A tip end part 38c of the large diameter part 38b can form a surface which is inclined at a predetermined angle.

Figure 19D:
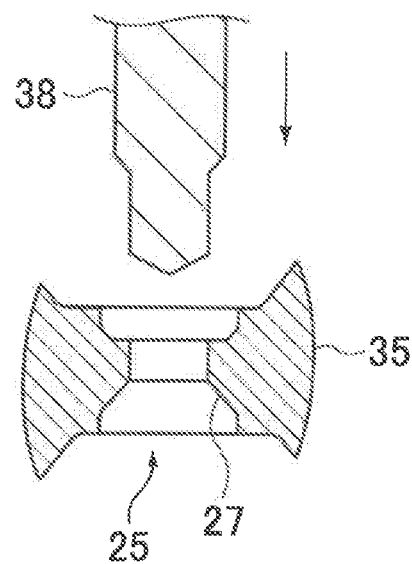

Accordingly, as shown in FIG. 19C and FIG. 19D, a through hole (hole which becomes the inserting part 29) having an equal diameter to the small diameter part 38a is formed. Further, in the receiving part 27 on one side of the thickness direction, a part of the inclined surface on the inserting part 29 side is formed by the tip end part 38c.

Next, as shown in FIG. 19D, the molded body 35 is cut by the stepped drill 38 from the side opposite to that described above. Due to this, in the receiving part on the other side of the thickness direction, a part of the inclined surface on the inserting part 29 side is formed by the tip end part 38c.

Note that, the inclined surfaces of the receiving parts 27 formed by the tip end part 38c preferably have equal inclination angles to those of the inclined surfaces of the receiving parts 27 formed by the inner surface of the shape 33. In the illustrated example, only parts of the receiving parts 27 were formed by the stepped drill 38. However, as understood from FIG. 19C, if the diameter of the large diameter part 38b is made larger, it is possible to form the entire receiving parts 27 by the stepped drill 38. In the illustrated example, when cutting the molded body 35 from one side in the thickness direction, the small diameter part 38a penetrates through the molded body 35. However, recessed parts may be formed by cutting, and the through hole may be formed first when the recessed parts formed on the two sides are communicated with each other. The stepped drill 38 for cutting from one side and the stepped drill 38 for cutting from the other side may be different as well.

Further, as already explained, the unwanted parts may also be removed after firing. This is true also in the case where a stepped drill 38 is used.

Other Embodiments

In the first embodiment, a tip 5 which was rectangular in shape when viewed on a plane and configured an end mill was taken as an example. However, the effective gate positions and positions of the divided surfaces etc. in the first embodiment can be applied to other various tips for cutting tool. In the following description, some of these will be exemplified.

Second Embodiment

Figure 12A:
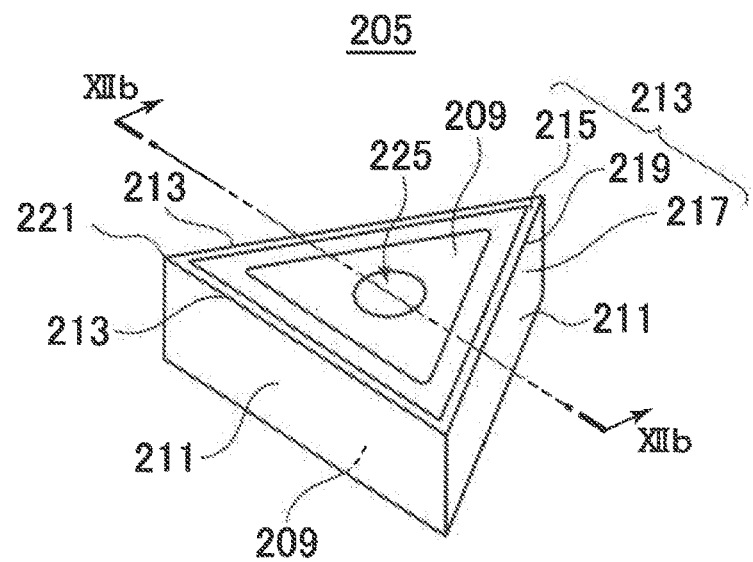
FIG. 12A is a perspective view showing a tip for cutting tool use according to a second embodiment.

FIG. 12A is a perspective view showing a tip 205 for cutting tool according to a second embodiment.

The tip 205 is a substantially triangular tip when viewed on a plane and for example is used as a tip of a tool bit. The tip 205 has a pair of major surfaces 209 and three side surfaces 211. Three cutting parts 213 are configured at edge parts formed by either of the pair of major surfaces 209 and the three side surfaces 211. Note that, three cutting parts 213 may be formed too at the edge parts formed by the other major surface 209 and the three side surfaces 211.

The cutting parts 213 are for example configured by rake faces 215 comprised of lands parallel to the major surfaces 209, flank faces 217 comprised of the side surface 211, and intersecting parts of the same, that is, cutting edges 219. The tip 205 has a mounting hole 225.

Figure 12B:
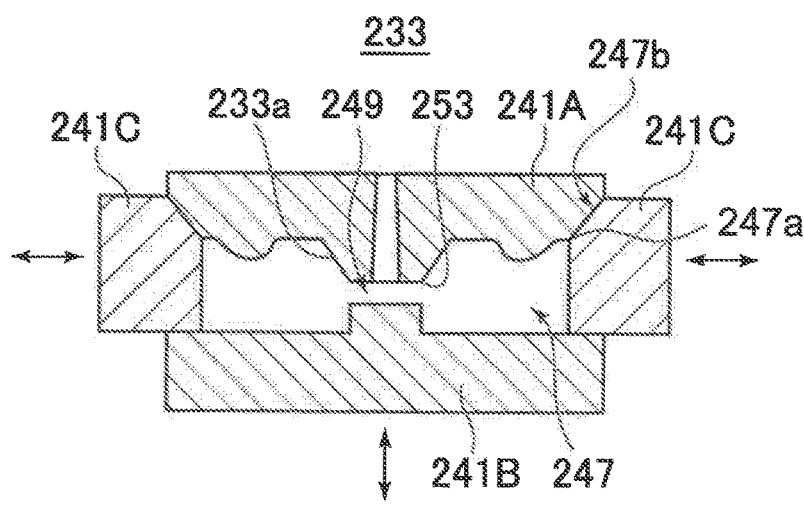
FIG. 12B is a cross-sectional view showing a mold for the tip for cutting tool use in FIG. 12A.
Figure 12C:
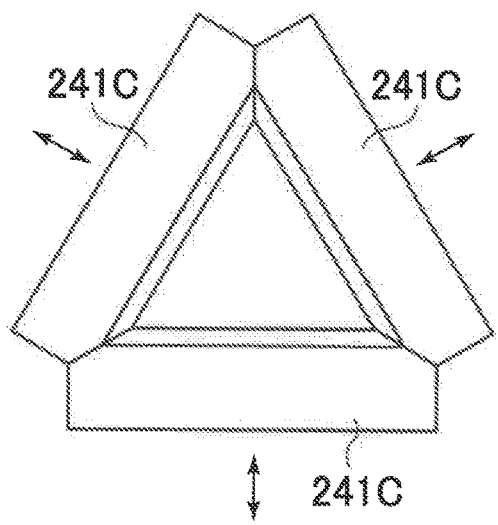
FIG. 12C is a plan view showing a part of the mold in FIG. 12B.

FIG. 12B is a cross-sectional view of a mold 233 for forming a molded body which becomes the tip 205 and corresponds to the XIIb-XIIb line in FIG. 12A. FIG. 12C is a plan view showing a part (side surface split molds 241C) of the mold 233.

Inside the mold 233, a cavity 247 corresponding to the tip 205 and a runner 249 communicated with the cavity 247 are formed. A gate 253 connecting the cavity 247 and the runner 249, for example, in the same way as the first embodiment, is provided in ring shape in a region corresponding to the inserting part in the mounting hole-forming surface 233a forming the inner surface of the mounting hole 225.

Further, the mold 233 is for example divided along ridgelines 247a corresponding to cutting edges 219 in the same way as the first embodiment, so has a first major surface split mold 241A, second major surface split mold 241B, and three side surface split molds 241C. Specifically, in the present embodiment, the two virtual surfaces are a surface parallel to the thickness direction and a surface perpendicular to the thickness direction, and the mated surfaces 247b extend in the direction inclined relative to them.

Third Embodiment

Figure 13A:
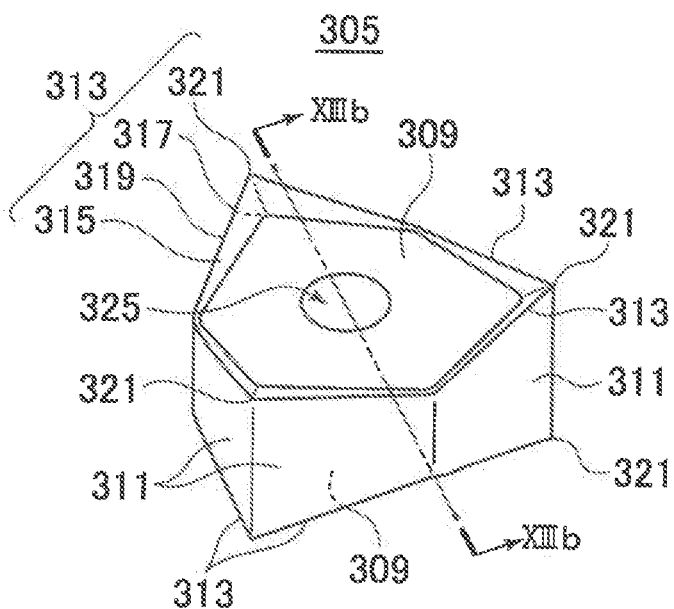
FIG. 13A is a perspective view showing a tip for cutting tool use according to a third embodiment.

FIG. 13A is a perspective view showing a tip 305 for cutting tool use according to a third embodiment.

The tip 305 is substantially hexagonal tip when viewed on a plane and is for example used as a tip of a face mill. The tip 305 has a pair of major surfaces 309 and six side surfaces 311. Twelve cutting parts 313 are formed in edge parts formed by the pair of major surfaces 309 and six side surfaces 311.

The hexagon is given a shape rotationally symmetric by 120°. Further, three angles located at positions which are rotationally symmetric by 120° are made smaller than the other three angles. Further, two cutting edges 319 which are connected by the corner 321 positioned at that relatively small angle are cutting edges which are simultaneously used.

The rake faces 315 continue from the major surfaces 309 and extend so as to rise from the major surfaces 309, the flank faces 319 continue from the side surfaces 311 and extend over the major surfaces 309, and the cutting edges 319 are located at positions higher than the major surfaces 309. The tip 305 has a mounting hole 325.

Figure 13B:
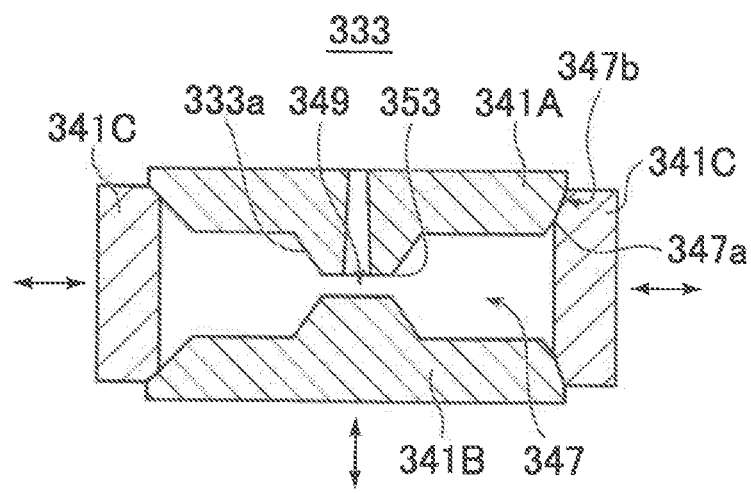
FIG. 13B is a cross-sectional view showing a mold for the tip for cutting tool use in FIG. 13A.
Figure 13C:
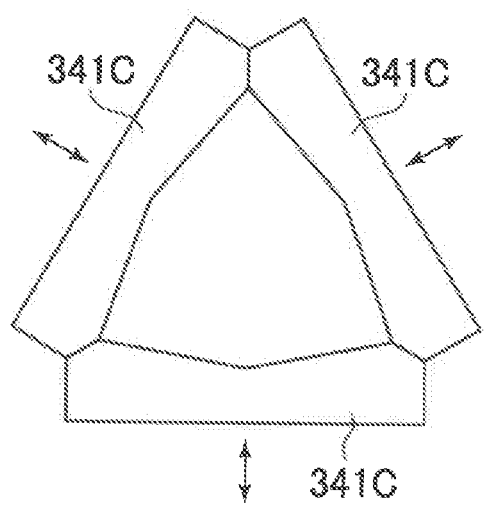
FIG. 13C is a plan view showing a part of the mold in FIG. 13B.

FIG. 13B is a cross-sectional view of a mold 333 for forming a molded body which becomes the tip 305 and corresponds to the XIIIb-XIIIb line in FIG. 13A. FIG. 13C is a plan view showing a part (side surface split molds 341C) of the mold 333.

Inside the mold 333, a cavity 347 corresponding to the tip 305 and a runner 349 communicated with the cavity 347 are formed. A gate 353 connecting the cavity 347 and the runner 349, for example, in the same way as the first embodiment, is provided in a ring shape in a region corresponding to the inserting part in the mounting hole-forming surface 333a of forming the inner surface of the mounting hole 325.

Further, the mold 333, for example, in the same way as the first embodiment, is divided along ridgelines 347a corresponding to the cutting edges 319, so has a first major surface split mold 341A, second major surface split mold 341B, and three side surface split molds 341C. In the illustrated example, the two virtual surfaces are a surface which is obtained by extending the surface corresponding to the rake face 315 and is inclined to the thickness direction and a surface which obtained by extending the surface corresponding to the flank face 317 and is parallel to the thickness direction. The mated surfaces 347b form an inclined surface having a smaller inclination relative to the thickness direction than that of the surface corresponding to the rake face 315.

Fourth Embodiment

Figure 14A:
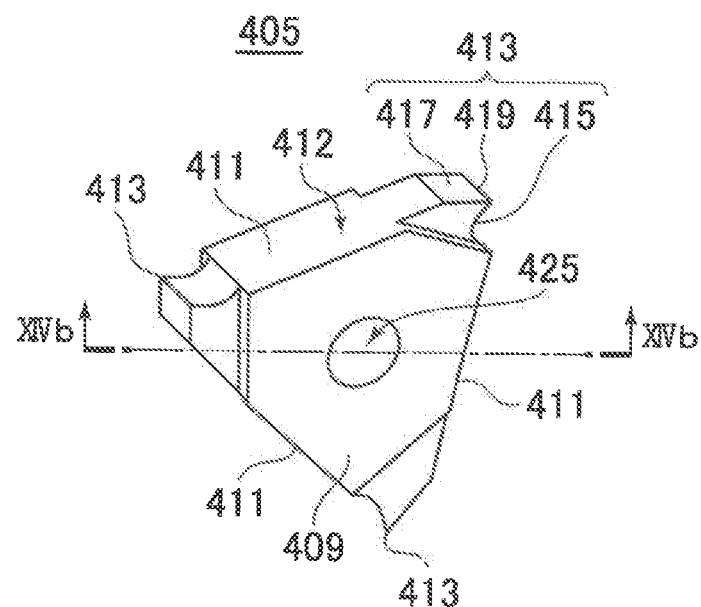
FIG. 14A is a perspective view showing a tip for cutting tool use according to a fourth embodiment.

FIG. 14A is a perspective view showing a tip 405 for cutting tool use according to a fourth embodiment.

In contrast to the first to third embodiments explained above in which the cutting edges were positioned at the edge parts formed by the major surfaces and the outer peripheral surfaces, in the tip 405, the cutting edge is positioned on the outer peripheral surface. Even in such an embodiment, it is possible to apply the already explained gate or divided surface. Specifically, this is as follows.

The tip 405 is a substantially triangular tip when viewed on a plane and is for example used as the tip of a tool bit for grooving (parting tool). The tip 405 substantially has a pair of major surfaces 409 and three side surfaces 411 (outer peripheral surface 412) and has three cutting parts 413 in edge parts formed by the three side surfaces 411.

The cutting part 413 for example has a concave rake face 415 formed on the edge part side of one side surface 411, a flank face 417 formed by chamfering the other side surface 411 continuing from this rake face 415, and a cutting edge 419 positioned in an intersection part of the rake face 415 and the flank face 417. The cutting edge 419 extends in the thickness direction of the tip 405. The tip 405 has a mounting hole 425.

Figure 14B:
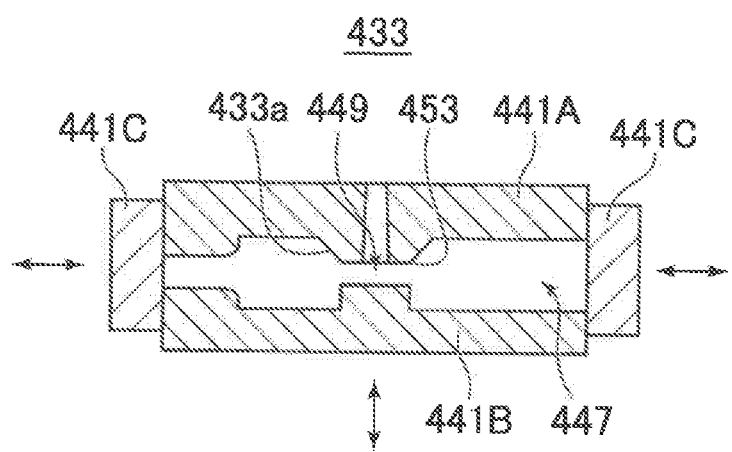
FIG. 14B is a cross-sectional view showing a mold for the tip for cutting tool use in FIG. 14A.
Figure 14C:
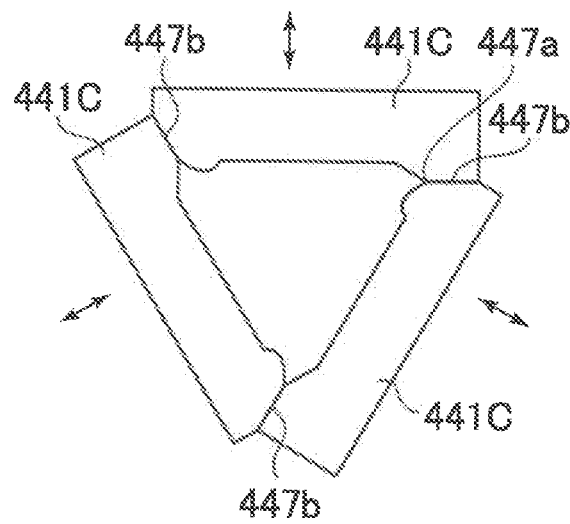
FIG. 14C is a plan view showing a part of the mold in FIG. 14B.

FIG. 14B is a cross-sectional view of a mold 433 for forming a molded body which becomes the tip 405 and corresponds to the XIVb-XIVb line in FIG. 14A. FIG. 14C is a plan view showing a part (side surface split molds 441C) of the mold 433.

Inside the mold 433, a cavity 447 corresponding to the tip 405 and a runner 449 communicated with the cavity 447 are formed. A gate 453 connecting the cavity 447 and the runner 449, for example, in the same way as the first embodiment, is provided in ring shape in a region corresponding to the inserting part in the mounting hole-forming surface 433a forming the inner surface of the mounting hole 425.

The mold 433, in the same way as the other embodiments, is divided along the ridgelines 447a (FIG. 14C) corresponding to the cutting edges 419, so has a first major surface split mold 441A, second major surface split mold 441B, and three side surface split molds 441C. Note, unlike the other embodiments, as shown in FIG. 14C, in the cross-sectional view (or plan view) along the major surface 409, the mated surfaces 447b of the side surface split molds 441C are positioned between two virtual surfaces (not shown) obtained by extending the surface corresponding to the rake face 415 and the surface corresponding to the flank face 417 to the intersecting part side of them.

Note that, the present invention is not limited to the above embodiments and may be executed in various ways.

The gate need not be positioned on the inner surface of the mounting hole (surface of the mold corresponding to the inner surface). For example, the gate may be positioned in a region surrounded by a plurality of cutting edges in the major surfaces of the tip as well.

REFERENCE SIGNS LIST

1 . . . cutting tool, 5 . . . tip for cutting tool use, 9 . . . major surface, 11 . . . side surface, 12 . . . outer peripheral surface, 19 . . . cutting edge, 25 . . . mounting hole, 31 . . . material, 33 . . . mold, 33a . . . mounting hole-forming surface, 35 . . . molded body, 39 . . . sintered body, 41 (41A to 41C) . . . split molds, 47 . . . cavity, 47a . . . ridgeline, 47b . . . mated surfaces (boundary part), 47r . . . recessed part, and 53 . . . gate.

What is claimed is:

1. A method of manufacturing a tip of a cutting tool, comprising:
   injecting a material into a mold to form the tip of the cutting tool, wherein
   the material is injected into the mold through a gate of the mold located on an inner side of a part corresponding to an intersecting ridge part formed by a major surface of the tip of the cutting tool and an outer peripheral surface of the tip of the cutting tool,
   the gate is located at a mounting hole-forming surface of the mold corresponding to an inner surface of a mounting hole of the tip of the cutting tool,
   the gate is provided continuously along an entirety of a circumferential direction of the mounting hole-forming surface, and
   along the circumferential direction of the mounting hole-forming surface, the gate differs in size in a thickness direction of the tip of the cutting tool.

2. The method of manufacturing the tip of the cutting tool according to claim 1, wherein a cutting edge is formed in the intersecting ridge part of the tip of the cutting tool.

3. The method of manufacturing the tip of the cutting tool according to claim 1, wherein:
   the gate comprises a first part and a second part which are located at different positions in the circumferential direction, and
   a distance from the second part to a wall surface of the mold corresponding to the outer peripheral surface of the tip of the cutting tool is greater than a distance from the first part to a wall surface of the mold corresponding to the outer peripheral surface of the tip of the cutting tool, and a dimension of the second part in a direction corresponding to the thickness direction is greater than a dimension of the first part in a direction corresponding to the thickness direction.

4. The method of manufacturing the tip of the cutting tool according to claim 1, wherein the mold comprises a projecting part that reduces in diameter from a surface of the mold corresponding to a major surface of the tip of the cutting tool to the gate, and a surface of the projecting part is comprised of at least a part of the mounting hole-forming surface.

5. A method of manufacturing a tip of a cutting tool, comprising:
   injecting a material into a mold to form the tip of the cutting tool,
   wherein
   the material is injected into the mold through a gate of the mold located on an inner side of a part corresponding to an intersecting ridge part formed by a major surface of the tip of the cutting tool and an outer peripheral surface of the tip of the cutting tool, the gate is located at a mounting hole-forming surface of the mold corresponding to an inner surface of a mounting hole of the tip of the cutting tool, and the gate comprises a plurality of openings arranged along an entirety of a circumferential direction of the mounting hole-forming surface.

6. The method of manufacturing the tip of the cutting tool according to claim 5, wherein distances from respective openings of the plurality of openings to a wall surface of the mold corresponding to the outer peripheral surface of the tip of the cutting tool are greater than distances from respective regions between the plurality of openings to a wall surface of the mold corresponding to the outer peripheral surface of the tip of the cutting tool.

7. The method of manufacturing the tip of the cutting tool according to claim 5, wherein:

the mold comprises a plurality of runners for supplying the material into the plurality of openings in the gate, and the plurality of runners linearly extend with constant cross-sectional areas to the plurality of openings from an inner side of the mounting hole-forming surface.

8. A method of manufacturing a tip of a cutting tool, comprising:

injecting a material into a mold to form the tip of the cutting tool, wherein the material is injected into the mold through a gate of the mold located on an inner side of a part corresponding to an intersecting ridge part formed by a major surface of the tip of the cutting tool and an outer peripheral surface of the tip of the cutting tool, the gate is located at a mounting hole-forming surface of the mold corresponding to an inner surface of a mounting hole of the tip of the cutting tool, the gate comprises a plurality of openings arranged in a circumferential direction of the mounting hole-forming surface, and the plurality of openings comprise two openings located on opposing sides of the gate.

\* \* \* \* \*